United States Patent
Taskin et al.

(10) Patent No.: US 10,708,837 B2
(45) Date of Patent: Jul. 7, 2020

(54) SYSTEM AND METHODS FOR CLIENT STEERING

(71) Applicant: Airties Kablosuz Iletisim Sanayi Ve Dis Ticaret A.S., Istanbul (TR)

(72) Inventors: Metin Ismail Taskin, Istanbul (TR); Muharrem Sarper Gokturk, Istanbul (TR)

(73) Assignee: AIRTIES KABLOSUZ ILETISIM SANAYI VE DIS TICARET A.S., Istanbul (TR)

( * ) Notice: Subject to any disclaimer, the term of this patent is extended or adjusted under 35 U.S.C. 154(b) by 0 days.

(21) Appl. No.: 16/001,298

(22) Filed: Jun. 6, 2018

(65) Prior Publication Data

US 2018/0352497 A1   Dec. 6, 2018

Related U.S. Application Data

(60) Provisional application No. 62/515,854, filed on Jun. 6, 2017.

(51) Int. Cl.
*H04W 36/24* (2009.01)
*H04W 36/00* (2009.01)
(Continued)

(52) U.S. Cl.
CPC .......... *H04W 36/24* (2013.01); *H04W 36/00* (2013.01); *H04W 36/0083* (2013.01);
(Continued)

(58) Field of Classification Search
CPC ..... H04W 40/08; H04W 36/00; H04W 36/24; H04W 36/08; H04W 36/0083;
(Continued)

(56) References Cited

U.S. PATENT DOCUMENTS 9,432,990 B2    8/2016 Birlik et al.
2002/0045453 A1*  4/2002 Juttner ............... H04L 45/12
                                                           455/445

(Continued)

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2012 (Mar. 29, 2012).

(Continued)

*Primary Examiner* — Un C Cho
*Assistant Examiner* — Lalita W Pace
(74) *Attorney, Agent, or Firm* — Volpe and Koenig, P.C.

(57) ABSTRACT

A method, system, and apparatus for optimizing a connection of a station (STA) in a mesh network of a plurality of 802.11 access points (APs) carried out by a client steering daemon (CSD) running on an AP of the plurality of APs. The CSD may calculate a cost ratio based on a plurality of metrics from a list and compare the signal strength information against a predetermined value. Based on the outcome of the signal strength comparison the CSD may analyze risk for the STA, determine a course of action for the STA based on the calculating, comparing, and analyzing and send instructions to a plurality of CSDs running on each of the plurality of APs for the course of action. The course of action may be keeping a STA associated with a current interface, guiding a STA to a destination interface, or kicking a STA to a destination interface.

18 Claims, 15 Drawing Sheets

(51) Int. Cl.
*H04W 36/08* (2009.01)
*H04W 36/38* (2009.01)
*H04W 84/18* (2009.01)
*H04W 84/12* (2009.01)

(52) U.S. Cl.
CPC ........... *H04W 36/08* (2013.01); *H04W 36/38* (2013.01); *H04W 84/12* (2013.01); *H04W 84/18* (2013.01)

(58) Field of Classification Search
CPC ..... H04W 84/12; H04W 84/18; H04W 36/38; H04W 36/30; H04M 15/8038; H04M 15/8044; H04M 15/8055; H04M 15/8061; H04M 2215/42; H04M 2215/745; H04M 2215/7886; H04L 63/0876; H04L 2012/6448; H04N 21/42684; H04N 1/32427; H04Q 2213/13138; H04Q 2213/138
See application file for complete search history.

(56) References Cited

U.S. PATENT DOCUMENTS

| | | | |
|---|---|---|---|
| 2008/0096575 A1* | 4/2008 | Aragon | H04W 36/22 455/453 |
| 2014/0059218 A1 | 2/2014 | Ganu et al. | |
| 2015/0245268 A1* | 8/2015 | Williams | H04W 76/14 370/331 |
| 2015/0350875 A1* | 12/2015 | Chhabra | H04W 36/0083 455/432.1 |
| 2015/0350974 A1* | 12/2015 | Patil | H04W 36/0083 370/331 |
| 2016/0007278 A1 | 1/2016 | Gupta et al. | |
| 2016/0036657 A1* | 2/2016 | Ardeli | H04W 48/20 370/235 |
| 2016/0242040 A1* | 8/2016 | Ganu | H04W 12/08 |
| 2016/0249267 A1 | 8/2016 | Ho et al. | |
| 2017/0280337 A1* | 9/2017 | Bahr | H04W 48/20 |
| 2017/0374602 A1 | 12/2017 | Gokturk et al. | |
| 2018/0241450 A1* | 8/2018 | Shukla | H04B 7/0617 |
| 2018/0270728 A1* | 9/2018 | Van Oost | H04W 76/15 |
| 2019/0297553 A1* | 9/2019 | Wang | H04W 36/08 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, Amendment 8: IEEE 802.11 Wireless Network Management, IEEE Std. 802.11v-2011 (Feb. 9, 2011).
LAN/MAN Standards Committee of the IEEE Computer Society, "IEEE Standard for Information technology—Telecommunications and information exchange between systems—Local and metropolitan area networks—Specific requirements. Part 11: Wireless LAN Medium Access Control (MAC) and Physical Layer (PHY) Specifications. Amendment 1: Radio Resource Measurement of Wireless LANs," IEEE Std. 802.11k-2008 (Jun. 12, 2008).

* cited by examiner

SYSTEM AND METHODS FOR CLIENT STEERING

CROSS REFERENCE TO RELATED APPLICATIONS

This application claims the benefit of U.S. Provisional Application No. 62/515,854, filed Jun. 6, 2017, the contents of which is hereby incorporated by reference herein.

FIELD OF ART

This application relates to wireless communication.

BACKGROUND

In the area of wireless communication networks, there may be a wireless device that connects to a first access point when the wireless device is within range of the first access point. The first access point may provide a connection to the Internet to the wireless device. The wireless device may move and it may be appropriate to connect to a different access point depending on a variety of factors. In some cases, there may be issues relating to facilitating and determining which access point to connect to when there is more than one option. Solutions for this, and other wireless communication problems, are addressed herein.

SUMMARY

A method, system, and apparatus for optimizing a connection of a station (STA) in a mesh network of a plurality of 802.11 access points (APs) carried out by a client steering daemon (CSD) running on an AP of the plurality of APs. The CSD may calculate a cost ratio based on a plurality of metrics from a list stored by the CSD and compare the signal strength information against a predetermined value. Based on the outcome of the signal strength comparison the CSD may analyze risk for the STA, determine a course of action for the STA based on the calculating, comparing, and analyzing and send instructions to a plurality of CSDs running on each of the plurality of APs for the course of action. The course of action may be keeping a STA associated with a current interface, guiding a STA to a destination interface, or kicking a STA to a destination interface.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1:
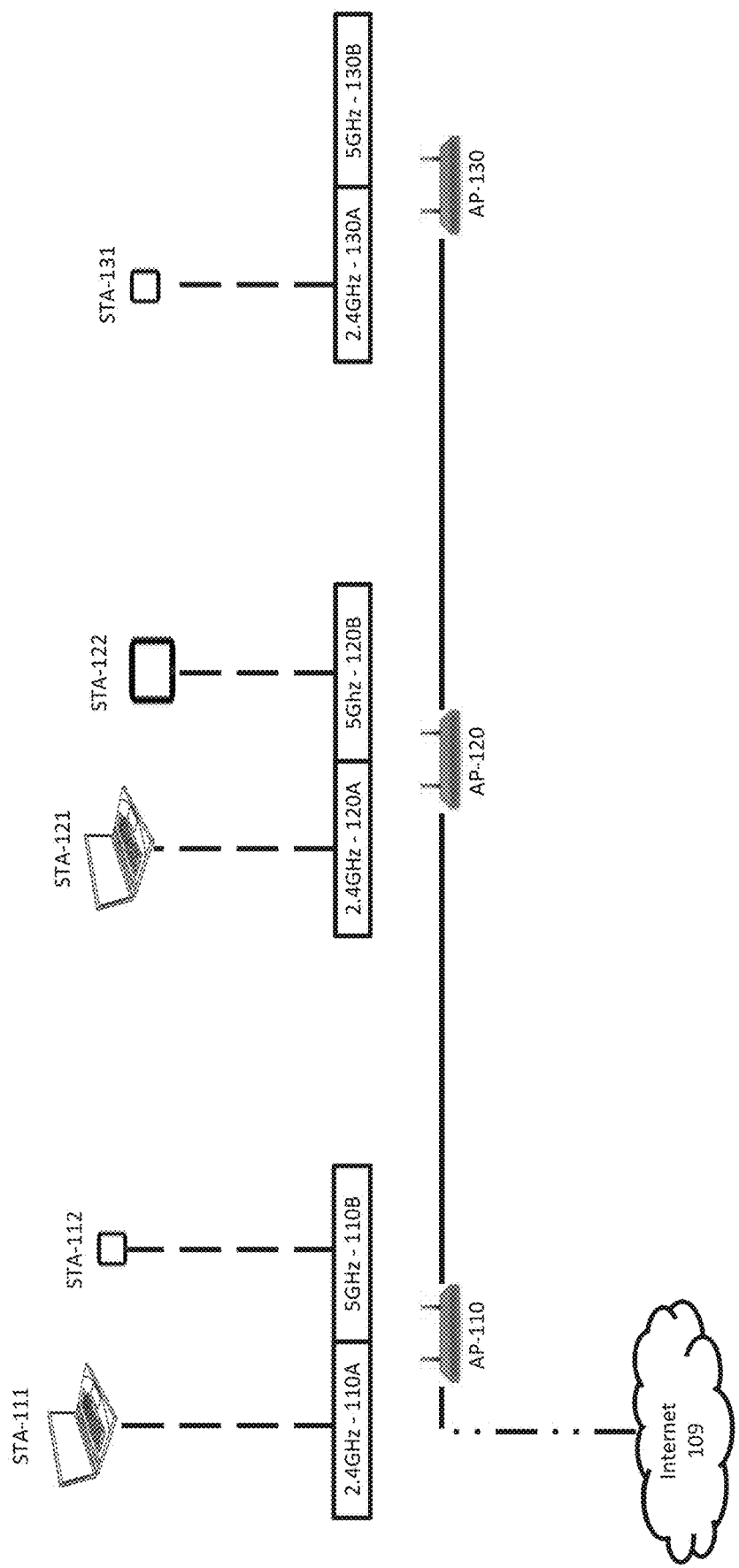
FIG. 1 illustrates an example communications system in which one or more disclosed embodiments may be implemented.

FIG. 1 illustrates an example communications system in which one or more disclosed embodiments may be implemented. A basic service set (BSS) may comprise of one or more Access Points (APs), such as AP-110, AP-120, and AP-130 as well as one or more stations (STAs) devices which are clients of the APs, such as laptop STA-111, smartphone STA-112, laptop STA-121, tablet STA-122, and smartphone STA-131. One AP may serve as the root-AP, which means that the other APs serve as nodes providing access to the root-AP, which in turn provides access to the Internet 109. AP-110 may act as the root-AP and be a gateway to Internet 109 and a wireless router. Each node may have a wired or wireless connection to each other and/or the root-AP. For example, AP-130 may be wirelessly connected to AP-120 which in turn is wirelessly connected to AP-110 which provides access to the Internet 109.

Each AP may have one or more interfaces that may comprise one or more operating bands of 802.11 (e.g., 2.4 GHz and 5 GHz). For example AP-110 may have a 2.4 GHz interface 110A and a 5 GHz interface 110B, AP-120 may have a 2.4 GHz interface 120A and a 5 GHz interface 120B, and AP-130 may have a 2.4 GHz interface 130A and a 5 GHz interface 130B. Each interface may broadcast an SSID, which may be the same or different per interface. For example, in FIG. 1, all 2.4 GHz interfaces 110A, 110B, and 110C may have the SSID Company_Private which is password protected, and all of the 5 GHz interfaces 110A, 110B, and 110C may have the SSID Company_Public which is not password protected. Multiple BSS's with the same service set identifier (SSID) may comprise an extended service set (ESS). A STA may be associated with a node in an ESS and access the Internet 109. For example, STA-131 may be wirelessly connected to AP-130 via the 2.4 GHz interface 130A to access the Internet 109.

As discussed herein, reference to an interface refers to the band of one AP, such as the 2.4 GHz band 110A of AP-110. Further, each interface may operate on an IEEE 802.11 channel of an IEEE 802.11 band.

For any AP or STA device as discussed herein, the device may comprise one or more operatively interconnected components, such as one or more processors, one or more memory module, one or more storage medium, one or more data interfaces, one or more means of receiving user input, one or more means of displaying information, one or more communications interface (e.g., 802.11 Radio, Ethernet), one or more power sources, and the like. In one example, a means of display may include an LCD screen, an OLED screen, an LED screen, a touch screen, and the like. In one example, a means of receiving user input may include a keyboard, a mouse, a touch screen, a keypad, a camera, a microphone, one or more buttons, and the like. A device may also have other sensors, such as a gyroscope, a GPS, an accelerometer, and the like.

In some cases, STAs may associate with a given interface based on the highest observed signal strength in comparison to other interfaces in the same service set. For example, AP-110, AP-120, and AP-130 may provide the same service set, and STA-122 may have access to all of the AP-110, AP-120, and AP-130, but the signal strength of AP-120 from the perspective of STA-122 may be higher, therefore STA-122 may associate with an interface of AP-120. A STA may behave in such a fashion in order to maximize the quality of its direct wireless link.

In some circumstances a STA may be highly mobile and move around based on the user's discretion, such as when the STA is a smartphone. Consequently, when a STA that is associated with a first AP moves to a location where it observes poor signal strength from the first AP, and there is a second AP that is a member of the same ESS that is closer and can provide a better route/link to the root-AP of the ESS, then the STA may be better off associating with the second AP.

In some circumstances, when a STA moves to a new location it may not wish to change the AP it is associated with while wandering in a network. The term "sticky client" may refer to such an instance where a STA does not change APs, or interfaces, even if there is an AP with better signal strength, even if the link quality with the AP the STA is currently associated with degrades significantly. A sticky client may result in drastic performance degradation in the overall performance of a wireless network (e.g., throughput) because when the link quality between the AP and the STA is poor, the AP and the STA may need to use lower modulation and coding schemes (MCSs) for successful packet delivery, which may take a higher share of airtime in comparison to transmissions of other STAs/APs with better quality links.

Client steering may address sticky clients, or other types of clients that could benefit from steering, by identifying the STAs that have low link quality, and seamlessly steering them to another interface that provides a better end-to-end route and/or higher link quality. Steering a client may comprise one or more actions, such as deauthenticating (i.e., kick) the client and/or placing the client on a list to attempt to move the client to a new interface, as further discussed herein.

Figure 2:
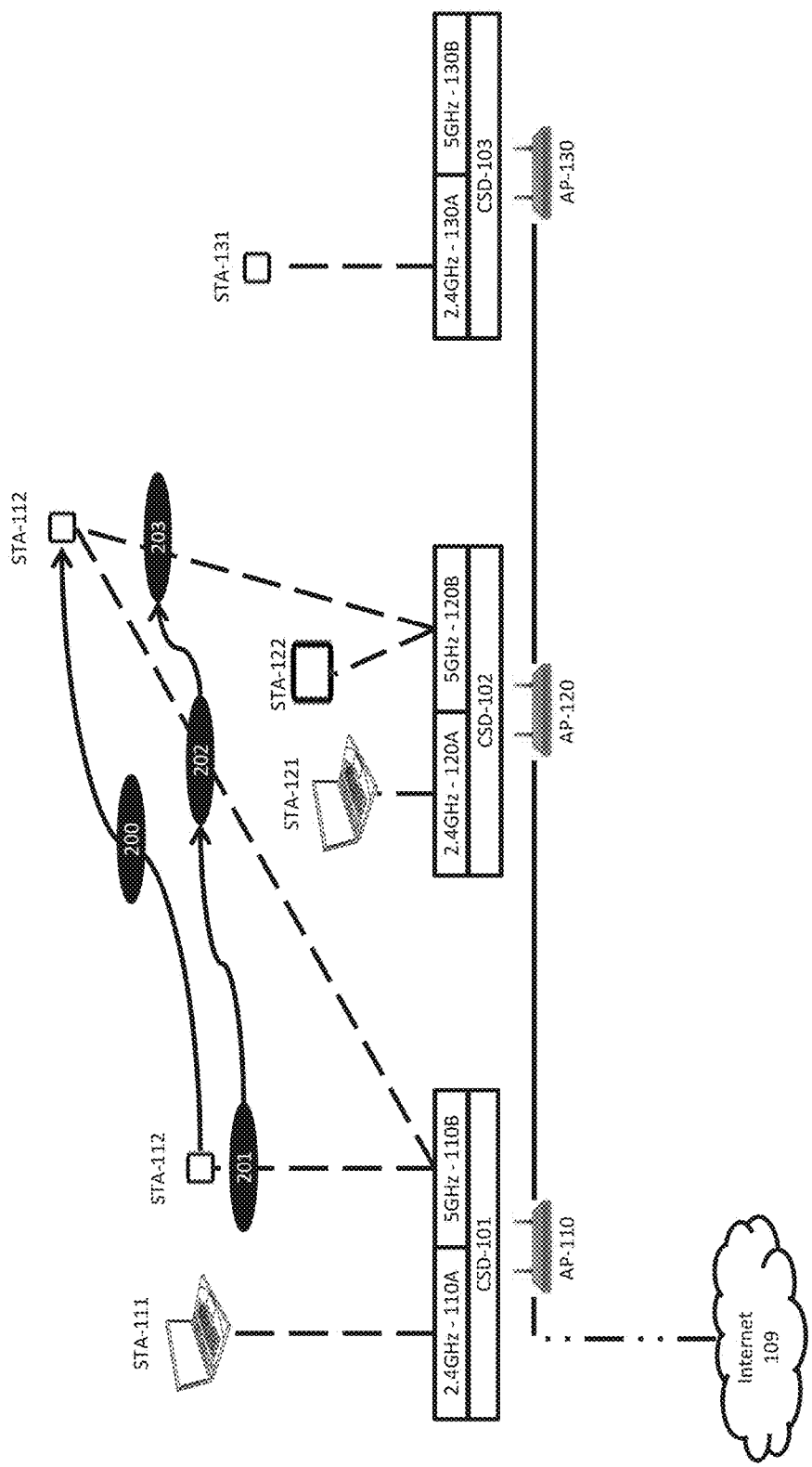
FIG. 2 illustrates an example of client steering functionality that may be performed by one or more Client Steering Daemons (CSDs)

FIG. 2 illustrates an example of client steering functionality that may be performed by one or more Client Steering Daemons (CSDs). A CSD may run on an AP or some other devices connected to the network and manage STA connections available in a network, such as a mesh network of APs. Alternatively, there may be a CSD that is run by a centralized controller which runs on a node of or in communication with the network (not shown). As discussed herein, like reference numerals in the figures may indicate like elements. The CSDs of a network may communicate with each other through a local area network, a mesh network, or through the internet.

In a simplified example shown in FIG. 2, STA-112 may move to a new location as shown by the arrow 200. Prior to the move at 201, the STA-112 may be connected to interface 110B. After and/or during the move at 202, the STA-112 may remain connected to interface 110B, but as a result of the move the link quality may suffer. At 203, the CSD-101 may determine that the STA-112 may be better off connected to interface 120B and steer STA-112 to interface 1208.

As can be seen, client steering may ensure a STA is connected to an interface that would result in minimum airtime usage, thereby improving the overall network performance. Further, the path that results in the minimum airtime usage and the path that provides the maximum end-to-end rate may be the same. In this way, a CSD may ensure that a STA may have the fastest end-to-end path. As discussed herein there may be embodiments that discuss systems, methods, and devices for client steering and various detailers related thereto.

Figure 3:
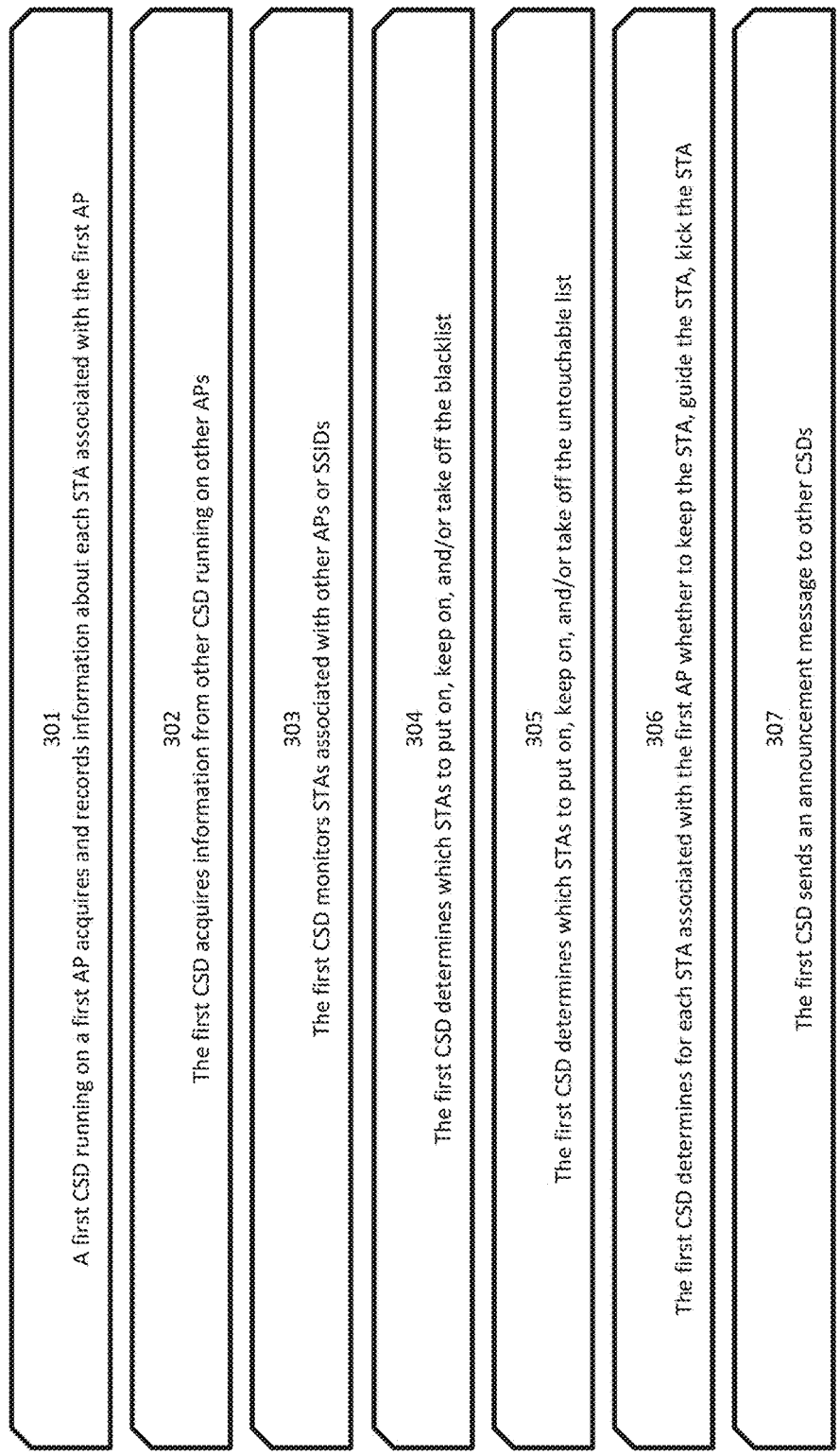
FIG. 3 illustrates a detailed example process related to client steering as performed by a CSD.

FIG. 3 illustrates a more detailed example process related to client steering as performed by a CSD. Each action or step taken may be performed periodically with a static or dynamically changing period. Further, each step or action may be triggered asynchronously by a triggering mechanism. The example process shown in FIG. 3 may relate to a communication system such as that shown in FIG. 2, where there is at least a CSD running on an AP that is part of a mesh network of APs each with their own CSDs. Alternatively, there may be a central controller CSD. It may be assumed that each CSD may perform some or all of the actions or steps described herein in any combination or order as necessary. Each AP may have zero or more STA associated with it, such as STA-131 connected to interface 130A. A CSD running on an AP regards each interface as a separate access point. That is to say, when a STA is associated with an interface on an AP, say 2.4 GHz interface, CSD considers the other interface, say 5 GHz, as a connection alternative for the STA, the same way as it considers the other alternative APs.

At 301 a CSD may acquire and record information about each STA connected to a particular interface of the AP running the CSD. For example, the information may include: signal strength (e.g., RSSI) and the time at which the signal strength was observed based on a packet sent from the STA to the first AP; idle time, which corresponds to the duration for which the AP has not received any packets from the STA); and/or other related information.

At 302 the CSD may acquire information from each of the other CSDs running on the other APs of the mesh network. For example, the information may include: signal strength (e.g., RSSI) of a STA connection and the time of the observed signal strength; physical (PHY) rate of the last transmitted packet; physical (PHY) rate of the last received packet; idle time, which corresponds to the duration for which the AP has not received any packets from the STA); and/or other related information.

At 303 the CSD may monitor for transmissions from STAs not associated with the CSD's AP for a configurable time duration. This also may be called performing station monitoring. This monitoring entails having the first AP receive and process packets that are not destined to itself, and thereby learn the RSSI of packets which are not destined to an interface of the AP running the CSD. The monitoring functionality may be enabled for a period of time then disabled; in one respect, the enabling-disabling-enabling may occur so seamlessly such that it is effectively continuous.

At 304 the CSD may evaluate and determine which STAs to put on, keep on, or remove from a blacklist.

At 305 the CSD may evaluate which STAs to put on, keep on, or remove from an untouchable list.

At 306 the CSD may make a determination whether to perform an action/step based on one or more acquired pieces of information and/or previous action(s)/step(s), wherein the determination may include a calculation of the cost for each STA's alternative end-to-end path. Based on this calculation, the CSD may determine to keep the STA(s), guide the STA(s) to other AP/interfaces/SSIDs, and/or kick the STA(s).

At 307 the CSD may send an announcement message to the other CSDs running on other APs within the mesh network. The announcement message may include: the signal strength (RSSI) of the STAs that are associated with the AP of the CSD; the idle time for the STAs that are currently associated with the AP of the CSD; the channel-capability information of the STAs that are associated with the AP of the CSD; the number of unsatisfactory kick actions carried out on the STA(s) that are associated with the AP of the CSD; the signal strength (RSSI) of the STA(s) that are overheard by the AP of the CSD through station monitoring and/or through broadcast messages sent by the STA(s) (e.g., probe requests); and/or other information discussed herein.

Figure 4:
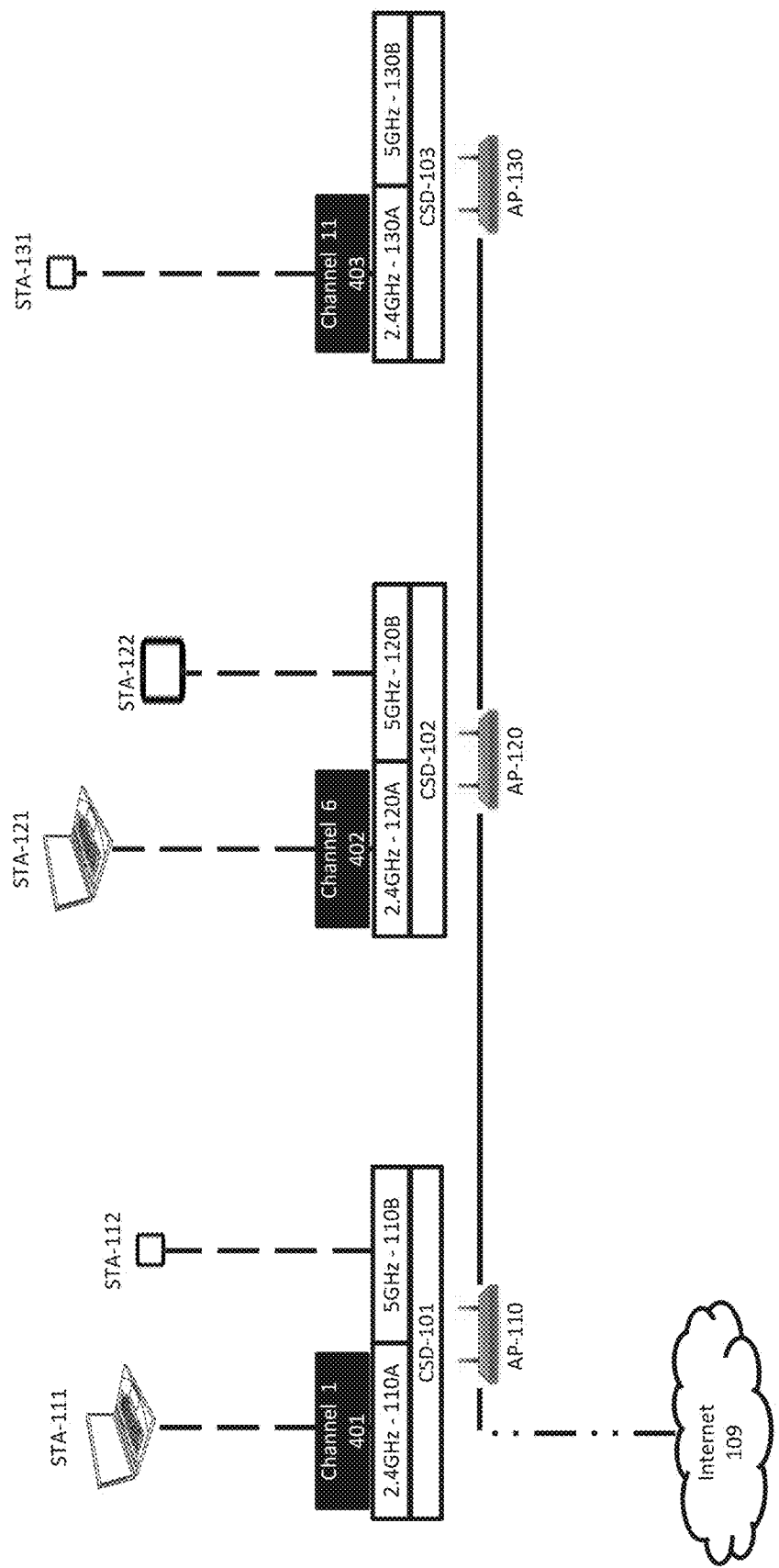
FIG. 4 illustrates an example scenario of station monitoring.

FIG. 4 illustrates an example where station monitoring may use categorization and subgroups. AP-110 may run a CSD-101, AP-120 may run CSD-102, and AP-130 may run CSD-103. Each CSD may observe and record signal strength information between a STA and an interface. For example, signal strength information may be gathered in terms of Received Signal Strength Indicator (RSSI) measured in dBm. The RSSI between a STA and an AP that the STA is associated with may be obtained via the wireless driver of the respective interface of the AP. A CSD may utilize control, management, and data frames sent by STAs to identify which interfaces/channels are supported by the STAs, and acquire the RSSI of a STA from the point of view of all APs in a network. A CSD may then store all of this information for all of the STAs in the network. This process may be repeated dynamically or periodically and the stored information may be updated. For example, CSD-101 running on AP-110 may have up-to-date and timely RSSI information about STA-112 for its connection to interface 110B, but it may not have up-to-date and timely RSSI information about STA-131 that is connected to interface 130A. Based on this example, the RSSI information regarding the STA to its connected interface may always be available to a CSD but the RSSI information of the STA to any interface may not always be available, since it may be acquired by a non-associated AP or non-connected interface via periodic monitoring of control, management, and data frames transmitted by the STA.

In one case, each CSD may monitor STAs that are associated with APs other than their own AP. For example, STA-111 may be associated with AP-110 and connected to its 2.4 GHz interface 110A and other APs CSDs, CSD-102 and CSD-103 may monitor STA-111 on the respective 2.4 GHz interfaces, 120A and 130A. Further, every AP, including AP-110, may monitor STA-111 on a 5 GHz interface, 110B, 120B, and 130B, since the STA-111 is only connected to the 2.4 GHz interface 110A of AP-110. Likewise, for STA-112 that is connected to the 5 GHz interface 110B, CSD-102 and CSD-103 may monitor this client using 2.4 GHz and 5 GHz interfaces, and CSD-101 may monitor STA-112 only on the 2.4 GHz interface 110A. For these examples, it may be assumed that the STA's are only connected to one interface of one AP at a time.

A CSD may group monitored STAs into several categories. In one category, an in-channel monitored STA may be a client that is associated with another interface that operates in the same channel as the interface a CSD uses to monitor of the same band. For example, where STA-111 is connected to 401 channel 1 of the 2.4 GHz interface 110A, then STA-111 may be regarded as an in-channel monitored STA by another 2.4 GHz interface that operates in the 401 channel 1 (not shown).

In another category, an off-channel monitored STA may be a client that is associated with another interface that operates in a different channel than the interface a CSD uses to monitor of the same band. For example, where STA-111 is connected to the 2.4 GHz interface 110A of 401 channel 1, then STA-111 may be regarded as an off-channel monitored STA by CSD-102 using interface 120A of the same 2.4 GHz band but operating in a different channel, 402 channel 6.

Off-channel monitored STAs may be further divided into subgroups based on their channels. For instance, consider a network with three APs as shown in FIG. 4, where each 2.4 GHz interface of the APs operates in a different channel (e.g., channels 1, 6, and 11). If there are STAs connected to each 2.4 GHz interface, then CSD-101 that uses interface 110A operating in 401 channel 1 may keep track of two subgroups of off-channel monitored STAs: one subgroup for the STAs that reside in 402 channel 6, and one subgroup for the STAs that reside in 403 channel 11. For example, CSD-101 would use a subgroup for each STA-121 and STA-131 since they are operating on different channels from within the 2.4 GHz band.

If all STAs are in-channel monitored STAs (i.e., if there is no off-channel monitored STAs) then the monitoring CSD may enable station monitoring for all the in-channel monitored STAs at once for a configurable duration. If there are both in-channel and off-channel monitored STAs, then the monitoring CSD activates off-channel scans according to a predetermined policy.

Figure 5:
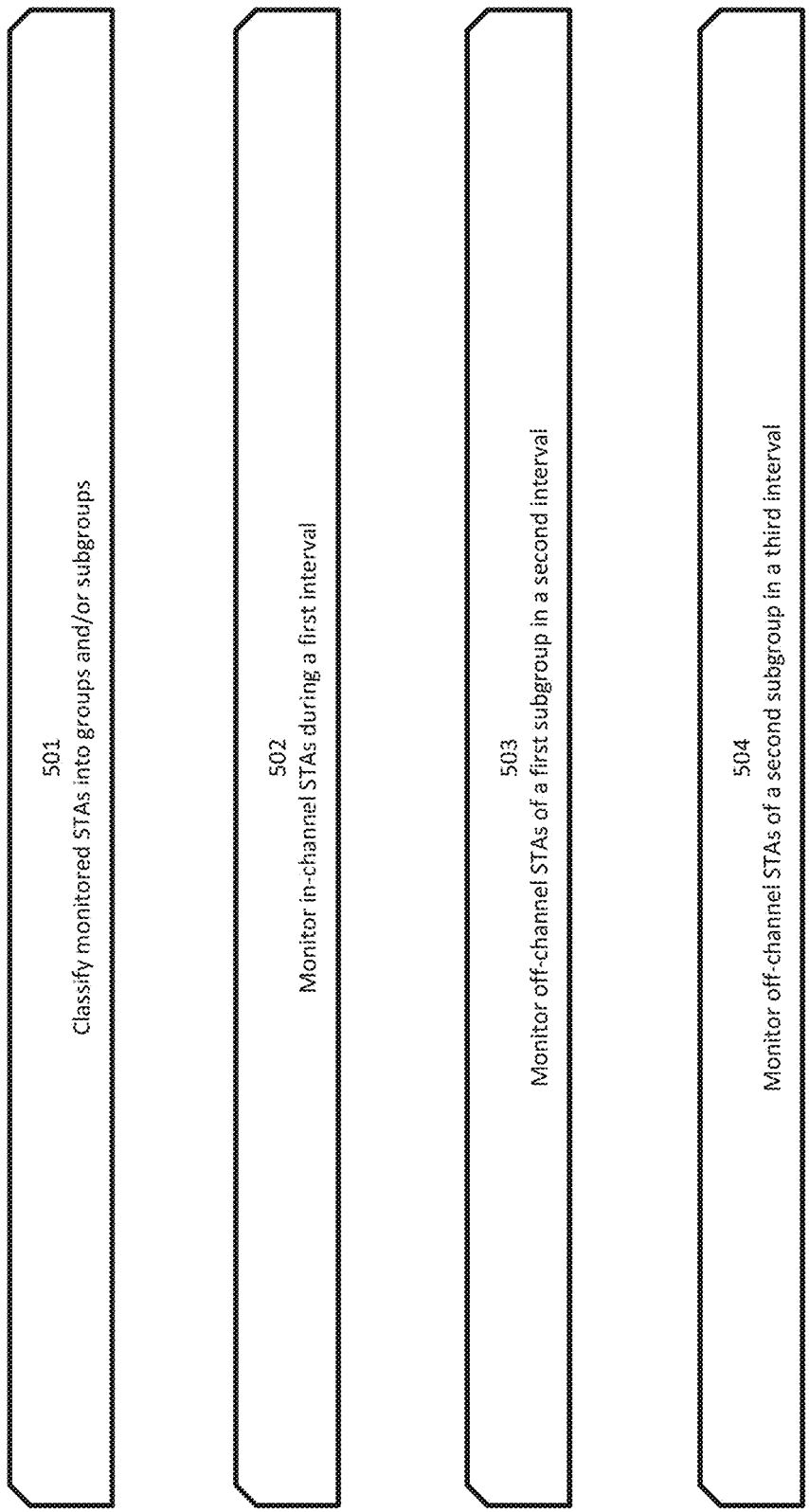
FIG. 5 illustrates an example process for station monitoring.

FIG. 5 illustrates an example policy for monitoring when there are both in-channel and off-channel STAs monitored. In this example, the perspective of one AP (e.g., 2.4 GHz) interface may be considered. At 501 the monitored STAs may be classified into groups and subgroups with respect to their channels. Thereafter, the AP may monitor one group/subgroup per interval of time. The AP may monitor different groups and subgroups in consecutive monitoring intervals. At 502, the AP may monitor the in-channel STAs during a first interval. At 503 the AP may monitor the off-channel STAs that belong to a first subgroup (e.g., subgroup-ch6) during a second interval. At 504 the AP may monitor the off-channel STAs that belong to another single subgroup (e.g., subgroup-ch11). The monitoring for off-channel STAs may continue for as many intervals as there are subgroups. For the off-channel monitoring either passive scanning or active scanning may be used. If there is neither in-channel nor off-channel monitored STAs, the station monitoring may not be activated. This process may repeat after all groups and subgroups have been monitored for their designated interval. As discussed herein, the station monitoring process may result in action, as discussed with regard to the example of FIG. 3.

In one embodiment, a CSD may learn and keep track of STA capabilities within a network. A CSD may have no prior assumption on the dual-band capability of APs or STAs in a network. A CSD may learn about the dual-band capability of the APs through announcement messages distributed among the APs. Furthermore, a CSD may learn about the channel-capability (i.e., the band capability) of the STAs by previous successful connections of the STAs, and by broadcast probe request frames sent in the respective channels. Specifically, a CSD may learn about a STA's channel capability by observing its packet transmissions in the operating channel and store this information in a channel-capability list along with other information related to that STA in memory of the CSD.

Once a CSD has learned this information, it may be distributed dynamically or periodically among other CSDs running on the other APs of a network. This may enable the APs that make up a network to possess the same capability information about a particular STA within that network. For example, if an AP has received probe requests from a STA in channels 1, 36, 40, 44, then the CSD running on this AP may enter these channels in a channel-capability list for the STA, and announce this information in its periodic announcement messages. Moreover, the CSD may add more channels in to the channel-capability list based on announcements from other CSD's of other APs (e.g., mesh peers), however, the CSD may not remove a channel from the channel-capability list based on information from other announcement messages, meaning that a given channel-capability may not be removed unless the entire channel-capability list for that STA is cleared, which may happen when the STA is completely removed from memory.

The CSD may designate that a STA may be channel-capable if the STA supports the operating control channel of a given interface. The CSD may deduce the STA's band capability through its knowledge of the STA's channel capability. For example, if a STA is known to support the 2.4 GHz and the 5 GHz channel the AP is currently operating in, then the STA may be marked as dual-band capable. CSD also learns about the channel/band capability of a STA through other CSDs' announcement messages.

The CSD may also learn the IEEE 802.11 protocols supported by each STA, such as IEEE 802.11a, .11b, .11g, .11n, .11ac, and store this information in memory. The CSD may also learn the number of spatial streams that is supported by the STAs and store this information in memory.

The CSD may unlearn (i.e., reset) all information about a STA when the duration since the STA's last association to any AP in the network exceeds a predetermined but configurable value, such as 7 days.

In one embodiment a CSD may utilize a client admission control, which is a blacklist mechanism used to reject STAs' association requests. For client admission control, each interface of an AP may have a separate blacklist and each of these blacklists may be capable of being enabled and being disabled independently of each other. A blacklist may have one or more parameters that may be used in combination or separately.

In one parameter, if a STA is in the blacklist of an interface, then the interface may not respond to probe requests, authentication requests, association requests, and/or re-association requests sent by the blacklisted STA on the interface.

In another parameter, if a STA is not in the blacklist of the interface, then the interface may respond to probe requests, authentication requests, association requests, and re-association requests sent by the STA.

In one scenario 5 GHz channel-capable STAs that are not associated with any AP of a given network may be kept in a blacklist of 2.4 GHz interface(s) since it may be preferable that the dual-band capable STAs are connected to 5 GHz interfaces rather than 2.4 GHz interfaces. These STAs may have been associated with an AP(s) of the network at some point previously, and a CSD(s) may have previously learned and stored the capability information of these STAs. For example, a STA may go into sleep-awake cycle where a dual-band capable STA may tend to connect to a 2.4 GHz interface when it awakes. In such an example, in an effort to avoid the occurrence of a possible steering action when the STA awakes and connects to a 2.4 GHz interface (i.e., steering from 2.4 GHz to 5 GHz), the STA's association request on the 2.4 GHz interfaces may not be accepted due to it being on the 2.4 GHz blacklist of that network.

When a STA is added to the blacklist, a timer may be activated for a predetermined duration, which may be called a blacklist timeout. In one scenario, if the CSD does not get any announcement messages regarding this STA during the blacklist timeout, and if the current 2.4 GHz and the current 5 GHz control channels of the AP are supported by the STA, then the CSD may remove the STA from the 5 GHz blacklist when the timer expires, but continue to keep the client in the 2.4 GHz blacklist. This STA may be removed from the 2.4 GHz blacklist if: it has not sent an authentication request message to the 5 GHz interface; it has been observed to send more than a preconfigured number (e.g., 2) of authentication messages on the 2.4 GHz interface within the last x seconds; and/or the time span between the first and the last authentication messages within x second on the 2.4 GHz interface is less than z seconds.

In another scenario, if the CSD does not get any announcement messages regarding a STA during the blacklist timeout, and if the current 5 GHz control channel of the AP is not supported but the current 2.4 GHz control channel is supported by the STA, then the CSD may remove this STA from both of the 2.4 GHz and 5 GHz blacklists when the timer expires.

Every time the CSD gets an announcement message (from another CSD) regarding a STA, it may reset the timer (to its initial value), and add the STA to the blacklist according to the information in the announcement message.

Also as part of the client admission control, a CSD may periodically evaluate which STAs to keep in and which STAs to remove from the blacklists. A CSD may keep or remove a STA from the blacklist even if the STA is not associated with the AP running the CSD, including if the STA is currently not associated with any AP in the network, but was associated with the AP or another AP of the network previously. This blacklist mechanism may be based on one or more rules, used in combination or separately, of a predetermined policy.

In one rule, if the average signal strength info of the STA (i.e., the RSSI observed by the AP which the STA is currently associated with obtained by every CSD in the network through the announcement messages) is less than a first configurable threshold, $T_1$, but above a second configurable threshold, $T_2$, then all CSDs may remove the STA from only the 5 GHz interfaces' blacklists'; if the RSSI of the STA is below $T_2$, then all CSDs may remove the STA from both 2.4 GHz and 5 GHz interfaces' blacklists'; otherwise all CSDs may keep the STA in the blacklists.

In one rule, if a STA is already removed from the blacklist due to a low RSSI, but currently the announced RSSI is above a third configurable threshold, $T_3$, then all CSDs may insert the STA to 2.4 GHz and 5 GHz interfaces' blacklists.

In one rule, if the idle time of a STA obtained by every CSD in the network through the announcement messages is above a configurable duration value, then the CSD may remove that STA from the 5 GHz interface's blacklists if the STA is channel-capable in 5 GHz, or, the CSD may remove that STA from the 2.4 GHz and 5 GHz interfaces' blacklists if the client is not channel-capable in 5 GHz.

In one rule, if the STA's idle duration announced by its associated AP is longer than the duration observed by an unassociated-AP, then the CSD running on the unassociated-AP may remove the STA from the blacklist(s) of the interface(s) that the STA is observed at. Further, the CSD may compare the last time it has heard from the STA at $t_0$, with the last time the AP that the STA is currently associated with heard from the client at $t_1$. Both $t_0$ and $t_1$ represent timestamps (i.e., actual times in seconds). Then, $t_1=t_b-d_i$, $d_i$ denotes the idle duration reported in the announcement message, and $t_b$ represents the current actual time (i.e., the actual time when the CSD is in the blacklist evaluation cycle). The CSD may remove the STA from the respective interface's blacklist when $d_i>q_1$ seconds and $t_0-t_1>q_2$ seconds (e.g., $q_1$ and $q_2$ may be equal to 4 s and 5 s, respectively).

In one rule, if the STA is not designated as associated to any AP, then the CSD may remove the STA from the 5 GHz blacklist but continue to keep it in the 2.4 GHz blacklist if the STA is channel-capable in 5 GHz, or the CSD may remove the STA from both 2.4 GHz and 5 GHz blacklists if the client is not channel-capable in 5 GHz.

In one rule, if the STA is in the untouchable list, then the CSD may never insert the client into any blacklists.

In one rule, if the STA is being guided, then the STA may be blacklisted by all interfaces except from the guided interface, and in some cases, the STA may also be blacklisted by the guiding interface.

As discussed herein, a CSD may disseminate STA (i.e., client) information in a network. The CSD may send periodic (e.g., every 3 seconds), or asynchronous, announcement messages to other CSDs to disseminate STA information within the network. The announcement messages may be transmitted through all available communication interfaces, such as Ethernet, PLC, and wireless (e.g., mesh) communication interfaces, and may not be transmitted through the STA interfaces, i.e., announcement messages are not sent to STAs, but sent to other CSDs in the network which may be attached to the network via several different communication interfaces.

When an announcement message is received, the CSD may update the STA Information with respect to the information contained in the announcement message. There may be one or more types of data about a STA that are either updated or created (if there is no previous data) once an announcement message is received.

One type of data may be STA RSSI, where the CSD may use the RSSI information gathered in the last n seconds. RSSI info older than n seconds may not need to be maintained. The amount of time may be configurable (e.g., n=20 seconds).

One type of data may be STA idle time, which may be measured with respect to the AP that the STA is associated with.

One type of data may be channel-capability of the STAs, which may comprise of the channels in which a STA has been observed transmitting packets.

One type of data may be kick fail and kick loss count, which is the number of unsatisfactory kick actions performed on the STA.

One type of data may be untouchable status, which if the STA is marked as untouchable, then the STA may not be inserted into the blacklists and may not be steered.

In one embodiment, a CSD may keep track of the number of unsuccessful steering actions performed on the STAs and may distribute this information within its periodic announcement messages. The CSD may learn about unsuccessful steering actions by keeping track of its own kick actions and/or by observing announcement messages sent by its mesh peers.

There may be three possible outcomes of a kick action categorized as "success," "fail," and "loss". A kick "success" may be where a STA is kicked and the STA associates with its designated interface within a first predetermined duration following the kick action. A kick "fail" may be where a STA is kicked and the STA associates with an interface other than the designated one within a duration between the first predetermined duration and a second predetermined duration following the kick action. A kick "loss" may be where a STA is kicked and the STA does not associate with any interface within the second predetermined duration following the kick action. In one example, the first predetermined duration and second predetermined duration may be 20 seconds and 40 seconds, respectively.

For each STA the CSD may keep track of the kick fail and kick loss events with the timestamp of each event. This information may be stored in memory. An event added to the list may be removed from the list following a predetermined duration of its addition. If a kick fail or kick loss count of a STA exceeds a predetermined count value (e.g., 2) the STA may be added to the untouchable list that way the STA may be exempt from all steering actions.

In one embodiment, the CSD may maintain an untouchables list. There may be STAs with MAC addresses specified in the untouchable list that may be exempt from all client steering operations. While on this list, these STAs may never be blacklisted or steered by the CSD. A STA may be inserted into the untouchable list either permanently by a user through manual entry via a user interface (e.g., on a console/telnet, an application from a mobile store, a web interface, a terminal, a command line, and the like) or dynamically by a steer-daemon through learning the number of failed kicks carried out on the client.

Each CSD may keep track of the number of kicks (i.e., deauthentications) a STA has encountered. This information may be stored as the "Kick Count." Each CSD may increment the kick count when it kicks (i.e., deauthenticates) a STA, at which point it may disseminate this information together with its periodic announcement messages. Based on these announcement messages, all CSDs of APs in the network may be informed about how many times a STA has been kicked (i.e., deauthenticated) in the network.

Clients with MAC addresses matching Organizationally Unique Identifier (OUI) specified in a touchable list may receive special treatment and may be subject to a different blacklist timeout duration than the other STAs. For example, whereas a blacklist timeout is set to 14 s for a regular STA, it may be set to 90 s for STAs in the touchable list.

In one embodiment, the CSD may asses the STA connection quality using a metric computation. The CSD may do this by smoothing out the STA RSSI before utilizing it for decision making. The CSD may use sliding window smoothing or other smoothing calculations on the observed signal strength (i.e., RSSI) and the signal strength obtained through announcement messages. The CSD may compute the weighted average of the RSSI samples using a smoothing technique, such as exponential smoothing. Exponential smoothing may use the following formula: $S=\alpha R[i]+(1-\alpha)$ $S_{prev}$, where S is the smoothed sample, $S_{prev}$ is the previous smoothed sample, α is the smoothing coefficient, and R[i] is the $i^{th}$ RSSI sample.

As discussed herein, the CSD may possess the RSSI information of the clients that are connected to the AP it is running on, thus, smoothing may always be carried out over a required number of samples. However, since RSSI information gathered from other APs may be infrequent, the number of RSSI samples gathered within the limited duration may vary. For such a case, the CSD may utilize thresholds that determine the reasonable number of RSSI samples for smoothing, based on the RSSI between the associated AP and the client.

The CSD may perform RSSI inference between the 2.4 GHz band and 5 GHz band interfaces. Specifically, when a STA is connected to an AP on its 2.4 GHz interface, the CSD may get up-to-date RSSI info about the STA on 2.4 GHz, whereas 5 GHz information may be infrequent and unpredictable since this information is obtained through broadcast messages sent by the STA (e.g., a probe request). In such cases, the CSD may infer the STA's RSSI on 5 GHz, if the STA is channel-capable in 5 GHz.

When the STA is dual-band capable (i.e., channel-capable in 2.4 GHz and 5 GHz), and the STA is connected on the 2.4 GHz interface, and the associated AP does not have RSSI information for 5 GHz (e.g., due to not receiving any packets from this STA on this interface), then the STA may infer the 5 GHz RSSI by subtracting a predetermined value from the 2.4 GHz RSSI. This predetermined value may be called an inference value (e.g., default at −8 dB).

The inference value may be updated during run-time when the CSD observes the client's transmissions in the 2.4 GHz and 5 GHz bands. Specifically, suppose that the client is associated with the 2.4 GHz interface of an AP, and the RSSI observed by the AP at time to is $P_0$ dBm. The AP may receive a packet with RSSI of $P_1$ dBm from this client in the 5 GHz band at time $t_1$. Let $\Delta(t) \leq |t_1 - t_0|$ and $\Delta(P) \leq P_0 - P_1$. If $\Delta(t) < 2.5$ seconds and $\Delta(P) < -8$ dB, then the 2.4 GHz to 5 GHz inference value may be set to $\Delta(P)$; otherwise the inference value may be kept as −8 dB. The updated inference value may be valid for a duration of 60 seconds, unless a new $\Delta(P)$ is calculated. In one case, the latest $\Delta(P)$ computed in the last 60 seconds may be used as the inference value if it is below −8 dB. If there is no inference value update within 60 seconds, then the inference value may be set to a predetermined default value (e.g., −8 dB).

When the STA is dual-band capable (channel-capable in 2.4 GHz and 5 GHz), and the client is connected on the 5 GHz interface, and the associated AP does not have valid RSSI info for 2.4 GHz (e.g., due to not receiving any packets from this client on this interface), then it may infer the 2.4 GHz RSSI by adding a predetermined value to the 5 GHz RSSI. For example, if the 5 GHz RSSI is −70 dBm, and the value is 3 dB, then the 2.4 GHz RSSI may be inferred as −67 dBm. This predetermined value may be set to 0 dB for example.

Inferring the 2.4 GHz RSSI from the 5 GHz RSSI may be enabled only if the 2.4 GHz RSSI is below a predetermined threshold, such as −80 dBm.

A CSD may also keep track of a shortest-path-metric (i.e., a path selected by the mesh routing daemon) between a root-AP and the other APs in the network, which may be called $M_{AP-rootAP}$. A CSD may use the RSSI information of a STA-to-AP link to estimate a link metric, which may be called $M_{STA-AP}$. The CSD may use these two metrics to compute an end-to-end cost, which is a measurement of the path between a STA to the root-AP, which is discussed further herein. This end-to-end cost may provide the basis for a decision analysis that the CSD performs, periodically or dynamically, to determine if a STA would be better off if it was connected to another interface on the same AP or an interface of another AP, at which point the CSD can then steer the STA to that alternative thereby ensuring that any given STA in a mesh network has the best connection possible. There may be a mesh routing daemon running on each AP, and it may be similar to a CSD in that it has its own messaging. The mesh daemons may continuously monitor mesh links, and compute link and end-to-end path metrics. A CSD may communicate with a mesh daemon to gather path metrics.

Figure 6:
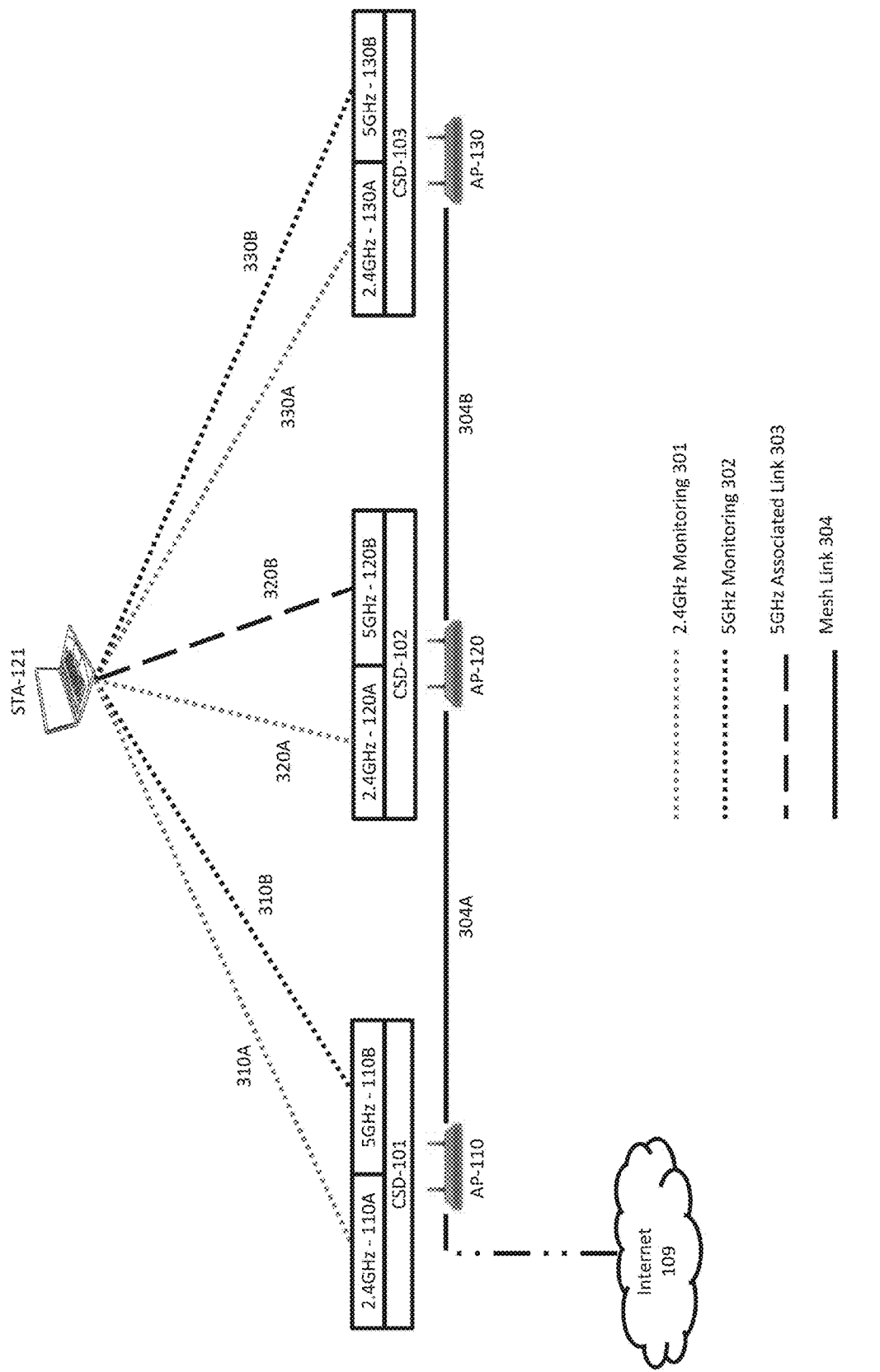
FIG. 6 illustrates an example of an end-to-end cost computation as carried about by a one or more CSDs.

FIG. 6 illustrates an example of an end-to-end cost computation diagram as carried out by one or more CSDs running on one or more APs. Each CSD, CSD-101, CSD-102, and CSD-103 may perform this computation periodically. As a note, only STA-121 may be shown just for purposes of this example. STA-121 may be associated with AP-120 via interface 120B as shown by long black dashed line 303. The CSD 102 may monitor STA-121 on the non-connected interface, interface 2.4 GHz 120A, of AP-120 as shown with line 301. STA-121 may also be monitored through all other non-associated interfaces, such as monitoring on interfaces of 2.4 GHz shown with grey dotted lines 301 and monitoring on interfaces of 5 GHz shown with black dotted lines 302. Further, the AP-110, AP-120, and AP-130 may have a mesh link, creating a mesh network, shown with solid black lines 304.

CSD-101, CSD-102, and CSD-103 may compute the cost of the STA-121 reaching the root-AP AP-110. The cost associated with a link may be inversely proportional to the physical rate, or expressed another way the cost may be proportional to the amount of airtime used on the link. For example, if the achievable physical rate on a link, such as between AP-110 and AP-120, is measured to be R=200 Mbps, the corresponding airtime usage is approximated may be T=1/R=1/200000000=5 nanoseconds (ns). Thus, if AP-110 can achieve a rate of 200 Mbps while transmitting to AP-120, the airtime usage for this communication may be 5 ns. As the achievable physical rate on a link is decreased, the airtime usage may be increased. For better airtime utilization, faster links may be utilized instead of slower links. Likewise, faster paths may be chosen instead of slower paths in order to optimize the airtime usage in the network.

Regarding the signal strength observations between the APs and STAs of FIG. 3, 310A designates STA-121's RSSI observed at interface 110A, 310B designates STA-121's RSSI observed at interface 110B, 320A designates STA-121's RSSI observed at interface 120A, 330A designates STA-121's RSSI observed at interface 130A, and 330B designates STA-121's RSSI observed at interface 130B. Since STA-121 is connected to interface 120B, the CSD-102 may acquire timely and up-to-date information for 320B, but CSD-102 may not acquire timely and up-to-date RSSI information for 320A since the STA-121 has no active packet transmission there. CSD-102 may acquire RSSI information on 320A when STA-121 transmits broadcast management frames, which occur infrequently and dependent on the STA-121's need. Due to the same reasoning, CSD-101 and CSD-103 may not acquire direct RSSI information on their 2.4 GHz interfaces, 110A and 130A, respectively. On the other hand, CSD-101 and CSD-103 may acquire RSSI information on their 5 GHz interfaces, 110B and 130B, respectively by using a station monitoring functionality, which may be acquired infrequently since it relies on merely monitoring STA-121's transmissions to AP-120, amid their own traffic, and for limited amounts of time.

As discussed herein, the CSD running on each AP may know which AP is the root-AP, and may periodically obtain $M_{AP\text{-}rootAP}$. For example, metric for the path between the root-AP AP-110 and AP-120 is 304A, and the metric for the path between AP-110 and AP-130 may be equal to 304A plus 304B. Each CSD may obtain $M_{AP\text{-}rootAP}$ information from a mesh routing daemon, and each CSD may distribute this AP-to-root-AP metric to the other CSDs running on other APs. By this way, the CSD running on each AP learns $M_{AP\text{-}rootAP}$ for each AP. Further, each CSD may convert the AP-STA link RSSI information to a metric $M_{STA\text{-}AP}$, via the following conversion policy: RSSI→PHY Rate→UDP Rate→Metric. The RSSI→PHY Rate conversion may be predefined within a CSD, but the other conversion rules may be defined by a metric module. Each CSD may maintain an RSSI→PHY Rate conversion table for this purpose.

Using the example configuration of FIG. 3 (mesh network of dual-band APs where the mesh links are established on the 5 GHz interface; thus 2.4 GHz is dedicated to STA connections, whereas 5 GHz interface is shared by STAs and the mesh APs), an exemplary cost computation that the CSD-102 performs for the end to end cost of root-AP AP-110 to STA-121 may be as follows:

If a STA is connected to a 5 GHz interface, $$C_{STA\text{-}rootAP} = M_{STA\text{-}AP} + M_{AP\text{-}rootAP}$$

If a STA is connected a 2.4 GHz interface, $$C_{STA\text{-}rootAP} = \max(M_{STA\text{-}AP}, M_{AP\text{-}rootAP})$$

As noted above, certain assumptions are made for the above equations: 5 GHz may be shared by the STA-AP links as the mesh AP-AP links, and both links cannot be used simultaneously, therefore, the costs may be added in such a scenario (see the first equation where a STA is connected to 5 GHz link). Then, if the STA is connected to a 2.4 GHz interface, it may not be shared since it would be dedicated for the use of the STAs, and this cost would be the highest (i.e., max) of the two link paths as shown in the second equation. This is just one example of how these scenarios may be handled, and the cost computation may be carried out in different ways.

As discussed, each CSD computes the costs for each possible path alternatives. For example CSD-102 computes the costs for path alternatives for STA-121. If there is no up-to-date link quality information about a link, such as RSSI information about the 330A link between STA-121 to interface 130A because no information has been able to be acquired, then the cost for that path may not be computed, and thus, that path may not be regarded as an alternative path (not shown). In one case, a cost computation regarding STA-121 may only be performed by CSD-102, the CSD running on the AP that the STA is associated with. In another case, a CSD that runs on a centralized controller may make this computation. In one case for the example of FIG. 3, it may be assumed that there is sufficient information for CSD-102 to make an assessment of every possible path for STA-121. For example, CSD-102 may consider the alternative path from STA-121 to the root AP-110 by being connected to interface 130B, where the cost would be equal to (metric from 330B)$_{STA\text{-}AP}$+(metric for 304B+the metric for 304A)$_{AP\text{-}rootAP}$.

After CSD-102 computes the costs for all alternative paths where sufficient information was available, CSD-102 choose the path with the minimum cost to STA-121, and if that is an alternative path compared to the current path of STA-121, then CSD-102 may take actions to steer STA-121 to the interface that belongs to the minimum cost path.

The CSDs running on different APs may be coordinated, thus a steering action triggered by one CSD running on one AP may cause coordinated actions on CSDs running on other APs, as discussed further herein.

As discussed herein, a CSD may perform decision analysis periodically, or in an asynchronous fashion, regarding whether to steer a STA(s) to other AP/interfaces/SSIDs based on one or more pieces of information that the CSD has gathered or receives as discussed herein. The CSD may make these decisions in a decision state. Steering decisions may be categorized into several types: Do not steer the STA (i.e., keep the client on the current AP/interface); guide the STA (i.e., persuade the client to roam to a AP/interface designated by the CSD); and/or Kick the STA (i.e., de-authenticate the client from its current AP/interface and explicitly specify the interface that should accept a connection attempt by the STA). For guiding the client type, the CSD may guide with dynamic adjustment of blacklists, or it may guide with dynamic adjustment of blacklists and utilize IEEE 802.11v BSS transition management request frame.

The CSD may decide to keep the STA if no other interfaces provide a lower cost than the current interface cost. If the decision is "keep the STA" then the CSD will keep announcing this client as a STA associated with its current interface, and may not initiate any steering actions.

The decision to guide the STA may include explicitly specifying which interface should accept association requests from this STA. Further, the CSD may guide the STA with 802.11v BSS transition management request and dynamic blacklist management, and/or the CSD may guide the STA implicitly by only dynamic blacklist management.

For any of the outcomes, a number of criteria may be considered during the decision process, such as: the cost ratio of the end-to-end path improvement provided by a new interface, as discussed herein; the RSSI at the associated band; the RSSI at the destination target interface; whether the destination interface is directly connected to a DHCP (dynamic host configuration protocol) server (i.e., gateway or root-AP of the mesh network) or not; and/or whether a ping pong effect, which also may be referred to as a fall-out risk, may occur between the current interface (i.e., associated interface) of the STA and a destination interface, for example when the observed RSSI changes abruptly after steering.

Figure 7:
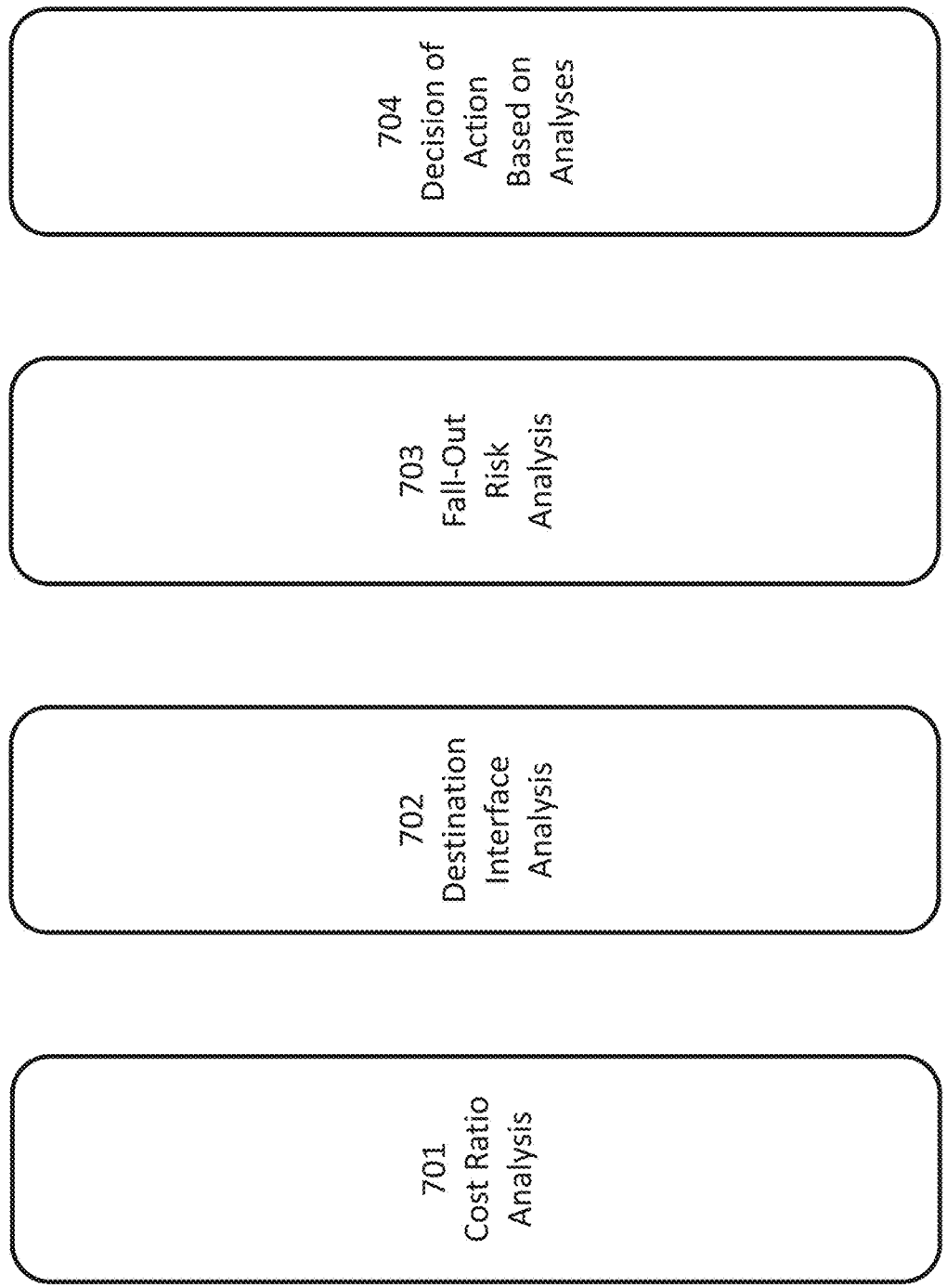
FIG. 7 illustrates an example of a decision analysis process for client steering.

Analyzing one or more of these criteria may present a stage of the decision analysis. FIG. 7 illustrates an example of the decision analysis process for client steering of a CSD using some of the criteria as discussed above. At 701 the Cost Ratio (CR) may be determined and compared against a predetermined value. The CR may be calculated as the cost at the associated interface of the STA minus the cost of the destination interface, all over the cost at the current interface of the STA in question: $(C_{assoc} - C_{dest})/C_{assoc}$.

At 702, the destination interface is analyzed and the RSSI observed at the destination interface (D-RSSI) may be compared to a predetermined value. D-RSSI may be a smoothed RSSI value as discussed herein. Also, it is determined whether or not the destination interface is directly connected to the root-AP and/or a DHCP server.

At 703, the fall-out risk may be assessed. The fall-out risk may determine a risk assessment about whether a ping-pong effect may occur due to a sudden change in the observed RSSI at the destination interface and the associated interface right after steering the STA. The assessment may be computed by adding a value W dB to the current interface RSSI, and consider it as the destination interface, where W is a predetermined value (e.g., 3 dB). Then, subtract W dB from the destination interface RSSI, and consider it as the associated interface. Then with these adjusted RSSIs for the associated and destination interface, compute the destination cost, associated cost, and a new CR. If the CR>0, then it may be assumed that there is fall-out risk, otherwise, it may be assumed that there is no fall-out risk.

At 704, a decision may be made to take a specific action, or in some cases take no action, based on the results of one or more of the previous stages. As discussed herein, the decision may result in one or more steering actions, such as: do not guide; guide; guide utilizing 802.11v (referred to as 11v); and/or kick the client.

If the decision is "Do not guide," then the CSD may exit the decision process without further evaluation. If the decision is "Guide," then the CSD may blacklist the STA where appropriate and send a guide message to each of its mesh peers indicating which interface to accept the STA. For example, if the STA is to be guided to an interface of another AP, then the steering CSD may blacklist the STA on the associated interface; or if the STA is to be guided to the alternate interface of the currently associated AP (e.g., moving from 2.4 GHz to 5 GHz of the same AP) then the steering CSD may remove the STA from the blacklist of the alternate interface. During the "Guide," the STA may be kept in the blacklist of all interfaces except for the designated interface (i.e., the interface which the STA is being steered to).

If the decision is "Guide+11v," then the CSD blacklists the STA where appropriate, send a guide message to each of its mesh peers indicating which interface to accept the STA, and issue a transmission of an IEEE 802.11v BSS transition management request message to the STA indicating the destination interface's MAC address in the message. For example, if the STA is being guided to an interface of another AP, then the steering AP may blacklist the client in its associated interface; or if the STA is being guided to the alternate interface of the currently associated AP (e.g., moving from 2.4 GHz to 5 GHz of the AP where the STA is associated) then the steering CSD may remove the STA from the blacklist of the alternate interface. During the "Guide+11v," the STA may be kept in blacklist of all interfaces except for the designated interface (i.e., the interface which the STA is being steered to).

If the decision is "kick the client," then the CSD may send an announcement (i.e., steer) message to each of its mesh peers indicating which interface to accept this STA. If the STA is being steered to another AP, then the CSD of the steering AP blacklists the client in all its interfaces for a blacklist timeout duration, and/or hides its SSID in the beacons sent from all its interfaces for a SSID hide timeout duration. If the STA is steered to the other interface of the AP associated with the STA then the steering AP blacklists the STA on the current interface for a duration of a blacklist timeout, and/or hides its SSID in the beacons sent from the interface from which the client is steered from for a duration of an SSID hide timeout. After a predetermined duration (e.g., 500 ms), the CSD may send a deauthenticate packet with reason code 8 to the STA. During the "kick," STA may be kept in the blacklist of all interfaces except for the designated interface (i.e., the interface which the STA is being steered to).

During the course of the decision analysis if the RSSI of the STA with its associated AP drops below a configurable threshold (e.g., −86 dBm) and the AP does not receive any announcements from any other AP regarding this STA, then the AP may decide to steer the STA to any interface in the network, by designating a broadcast address as the receiver address (i.e., FF:FF:FF:FF:FF:FF).

A Guide message may include the MAC address of the destination interface and the CSD may transmit the guide message when the decision state is changed from "do not guide" to "guide" or "guide+11v," when the destination is changed, and/or when there are X guide decisions in a row, where X may be predetermined. For example, if X=4, and if the target interface is the same for all guide decisions, then the first guide decision may be announced, the second, third and fourth decisions are skipped, and the fifth is announced, and so on; further, only one guide message may be transmitted every X*1.5 which may equal 6 s, which may result in the first guide message sent at $t_1$=0, the second guide message sent at $t_2$=6 s, and the third guide message is sent at $t_3$=12 s.

In case a decision change occurs during the course of guiding, such as guiding the STA to another interface, the guiding and announcement process may be reset. Hence, if after the first announcement the CSD of the guiding interface changes its decision and chooses to guide the client to another interface, the new decision may be announced.

If there are multiple STAs to be guided from the same AP, then the decisions on these STAs may be announced within the same guide message. Thus, neither the number nor frequency of guide messages may be increased with the increased number of guided STAs from the same AP. Also, the BSS transition management request message may be transmitted after a predetermined duration (e.g., 500 ms), following the issuing of its transmission. A BSS transition management request message may be issued together with the guide message, except for the first guide message.

An example of a valid guide announcement may be where the destination interface removes and does not add the guided STA to its blacklist. A guide announcement may be valid until a guide timeout duration is completed. Specifically, the destination interface may remove the STA from its blacklist as it receives the guide message, and it may not reinsert this client to the blacklist, until: another guide message is received for this STA but this time destination interface is not itself (e.g., the STA is guided to another interface); or a guide timeout is reached. In one example, a guide timeout may be set to 30 seconds for STAs not in the touchable list, and may be set to 90 seconds for the STAs in the touchable list.

Guide and kick announcement messages may have unique, monotonically increasing sequence numbers.

When an AP receives a guide announcement and it has the guide destination interface, then the AP may remove the client in the intended interface's blacklist. Prior to receiving the guide announcement, the STA may be in the blacklist of both interfaces of the destination AP. The destination AP may keep the STA in the blacklist of its other interface (i.e., not destination interface). If the destination address is a broadcast address, then any interface, except for the originating interface (i.e., the interface of the steering AP) may be regarded as the destination.

When an AP receives a guide announcement and it does not have the destination interface, then the AP may blacklist the STA in all its interfaces (i.e., continues to keep this STA in all its interfaces' blacklists). Following the reception of a second guide message from the guiding AP, if the AP receives an authentication request message from the guided STA, the AP may remove the client from the blacklist of the interface from which it received the authentication request.

When an AP receives a kick announcement, and the AP has the destination interface of the kick announcement, then the AP removes the client in the intended interface's blacklist. Prior to receiving the steering announcement, the STA may be in the blacklist of both interfaces of the destination AP. The destination AP may keep the client in the blacklist of its other interface (i.e., not destination interface). The AP may then hide its SSID in the beacons sent from its other interface (i.e., not the intended interface).

When an AP receives a kick announcement, and the AP does not have the destination interface of the kick announcement, then the AP blacklists the STA in all its interfaces (i.e., continues to keep this client in all its interfaces' blacklists). The AP doing the steering may also hide its SSID in the beacons sent from all its interfaces (i.e., in circumstances where the STA is being steered to another interface at another AP rather than a second interface of the steering AP).

Figure 8A:
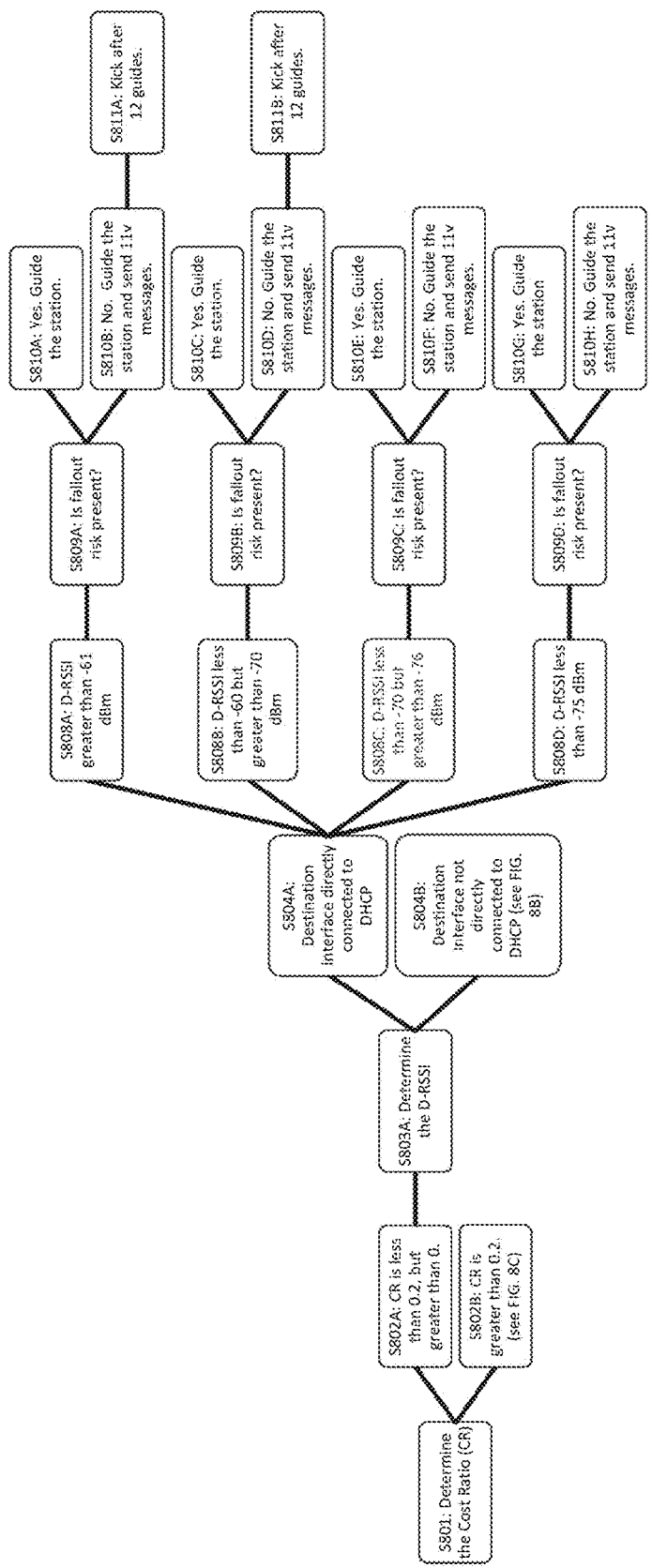
FIG. 8A illustrates a first part of an example implementation of a decisional analysis according to one or more embodiments.

FIG. 8A illustrates a first part of an example decision process for a STA moving in example scenario 800 from a 2.4 GHz band to another 2.4 GHz band. Initially, at S801 the CSD may determine the Cost Ratio (CR) using the techniques discussed herein. At S802A, the CR may be less than 0.2, but greater than 0, and then at S803A the CSD may determine the signal strength (i.e, RSSI) at the destination interface (D-RSSI). Next, it may be determined if the destination Interface directly connected to DHCP. Specifically, it may be determined if the associated interface/AP is a DHCP client (Assoc=DHCPC) (i.e., the interface IP address is assigned by a DHCP server) and/or if the destination interface/AP is not a DHCP client (Dest=DHCP), where the destination is either a DHCP server, or it is directly (via Ethernet) attached to a DHCP server. In one example, the AP that is marked as DHCP is the root-AP. Hence, this step checks if the destination is the root-AP or not.

At S804A, the destination interface is directly connected, and the value of the D-RSSI then dictates the next step. At S808A, D-RSSI may be greater than −61 dBm. At S809A it may be determined if there is fallout risk present based on the techniques described herein. At S810A, if there is a fallout risk, then the CSD may guide the STA. As discussed herein, the CSD may guide the STA by sending a message to the other CSDs. At S810B, if there is no fallout risk, then the CSD may guide the STA and send 11v messages. At S811A, if after 12 unsuccessful guide attempts, then the STA may be kicked.

At S808B, D-RSSI may be less than −60 but greater than −70 dBm. At S809B, it may be determined if there is fallout risk present. At S810C, if fallout risk is present, then the CSD may guide the STA. At S810D, if fallout risk is not present, then the CSD may guide the STA and send 11v messages. At S811B, if after 12 unsuccessful guide attempts, the STA may be kicked.

At S808C, D-RSSI may be less than −70 but greater than −76 dBm. At S809C, it may be determined if there is fallout risk present. At S810E, if fallout risk is present, then the CSD may guide the STA. At S810F, if fallout risk is not present, then the CSD may guide the STA and send 11v messages.

At S808D, D-RSSI may be less than −75 dBm. At S809D, if may be determined if there is fallout risk present. At S810G, if there is fallout risk present, then the CSD may guide the STA. At S810H, if there is no fallout risk present, then the CSD may guide the STA and send 11v messages.

Figure 8B:
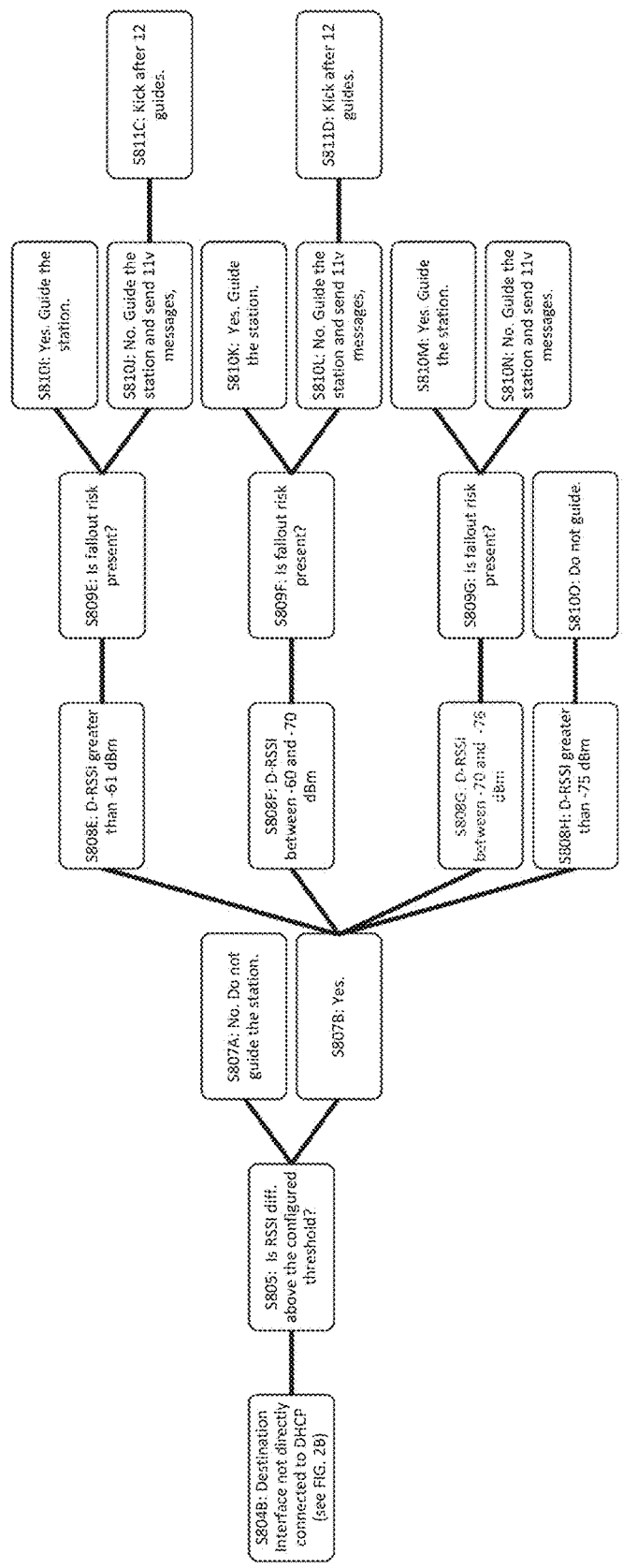
FIG. 8B illustrates a second part of an example implementation of a decisional analysis according to one or more embodiments.

FIG. 8B illustrates a second part of an example decision process for a STA moving in example scenario 800 from a 2.4 GHz band to another 2.4 GHz band. At S804B, the destination interface is not directly connected to DHCP, and then at S805 the difference between the RSSI observed at the destination and the associated interfaces may be determined. This step may check if the STA RSSI observed at the destination interface/AP is greater than the one observed at the associated interface/AP by a margin defined by a predetermined but configurable threshold (TH) (RSSI diff>TH). An exemplary TH is 10 dB. At S807A, if the RSSI diff is not greater than the TH, then the STA is not guided. At S807B, if the RSSI diff is greater than the TH, then the value of the D-RSSI dictates the next step.

At S808E, the D-RSSI may be greater than −61 dBm. At S809E, it may be determined if there is fallout risk present. At S810I, if there is fallout risk present, then the CSD may guide the STA. At S810J, if there is not fallout risk present, then the CSD may guide the STA and send 11v messages. At S811C, if after 12 unsuccessful guide attempts, then the STA may be kicked.

At S808F, the D-RSSI may be between −60 and −70 dBm. At S809F, it may be determined if there is fallout risk present. At S810K, if there is fallout risk present, then the CSD may guide the STA. At S810L, if there is no fallout risk present, then the CSD may guide the STA and send 11v messages. At S811D, if after 12 unsuccessful guide attempts, then the STA may be kicked.

At S808G, the D-RSSI may be between −70 and −76 dBm. At S809G, it may be determined if there is fallout risk present. At S810M, if there is fallout risk present, then the CSD may guide the STA. At S810N, if there is no fallout risk present, then the CSD may guide the STA and send 11v messages.

At S808H, the D-RSSI greater than −75 dBm, in which case at S810O the CSD may determine not to not guide the STA.

Figure 8C:
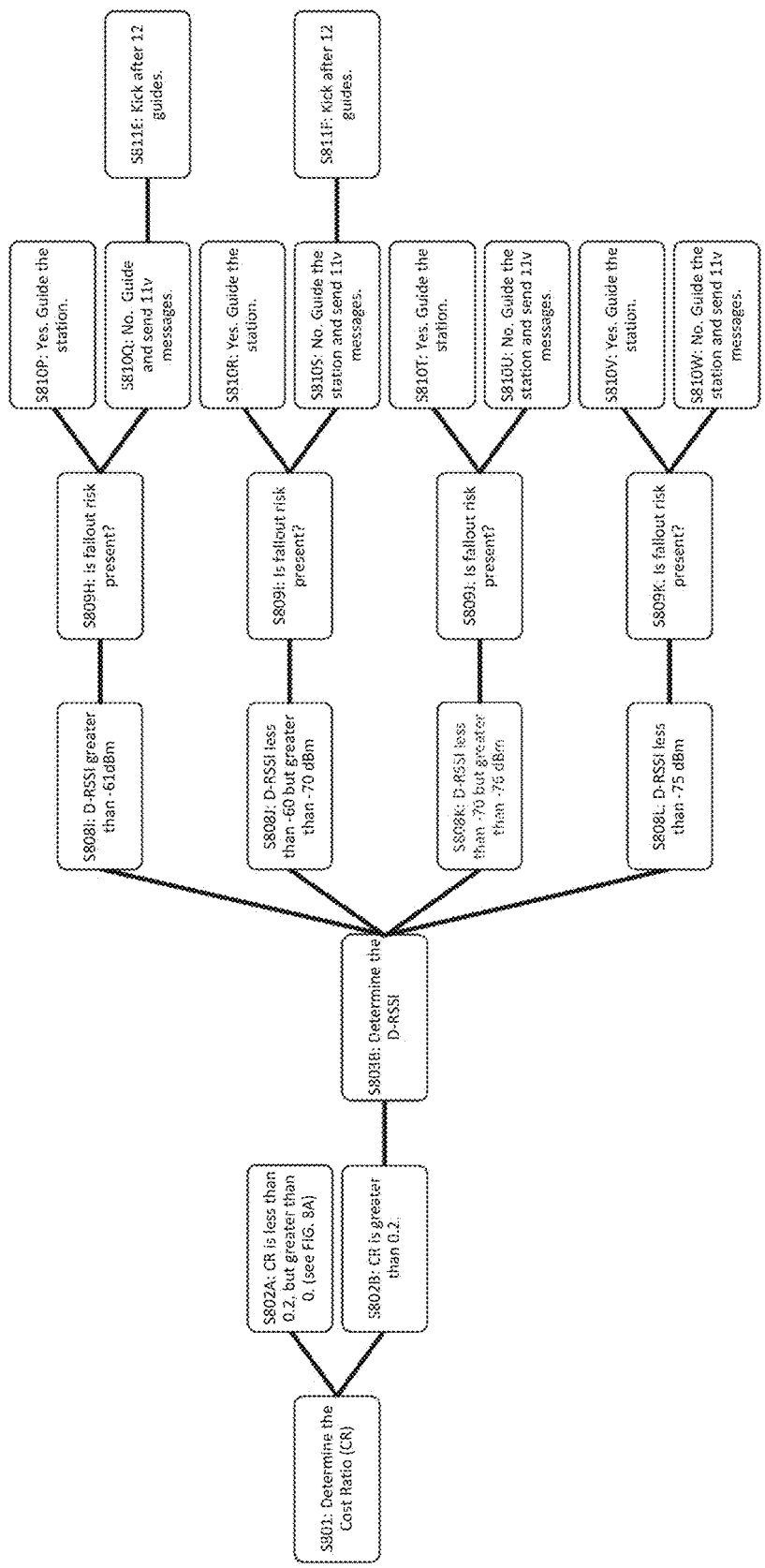
FIG. 8C illustrates a third part of an example implementation of a decisional analysis according to one or more embodiments.

FIG. 8C illustrates a second part of an example decision process for a STA moving in example scenario 800 from a 2.4 GHz band to another 2.4 GHz band. Just as before, initially, at S801 the CR may be determined, and at S802B, the CR may be greater than 0.2. Next, at S803B the D-RSSI may be determined. At S808I, the D-RSSI may be greater than −61 dBm, and at S809H it may be determined if there is fallout risk present. At S810P, if there is fallout risk present, then the CSD may guide the STA. At S810Q, if there is not fallout risk present, the CSD may guide the STA and send 11v messages. At S811E, if there are 12 unsuccessful guide attempts, then the STA may be kicked.

At S808J, D-RSSI may be less than −60 but greater than −70 dBm, then at S809I it may be determined if there is fallout risk present. At S810R, if there is fallout risk present, then the CSD may guide the STA. At S810S, if there is no fallout risk present, then the CSD may guide the STA and send 11v messages. At S811F, if there are 12 unsuccessful guide attempts, then the STA may be kicked.

At S808K, D-RSSI may be less than −70 but greater than −76 dBm, then at S809J it may be determined if there is fallout risk present. At S810T, if there is fallout risk present, then the CSD may guide the STA. At S810U, if there is no fallout risk present, then the CSD may guide the STA and send 11v messages.

At S808L, D-RSSI may be less than −75 dBm, then at S809K, it may be determined if there is fallout risk present. At S810V, if there is fallout risk present, then the CSD may guide the STA. At S810W if there is no fallout risk present, then the CSD may guide the STA and send 11v messages.

Figure 9:
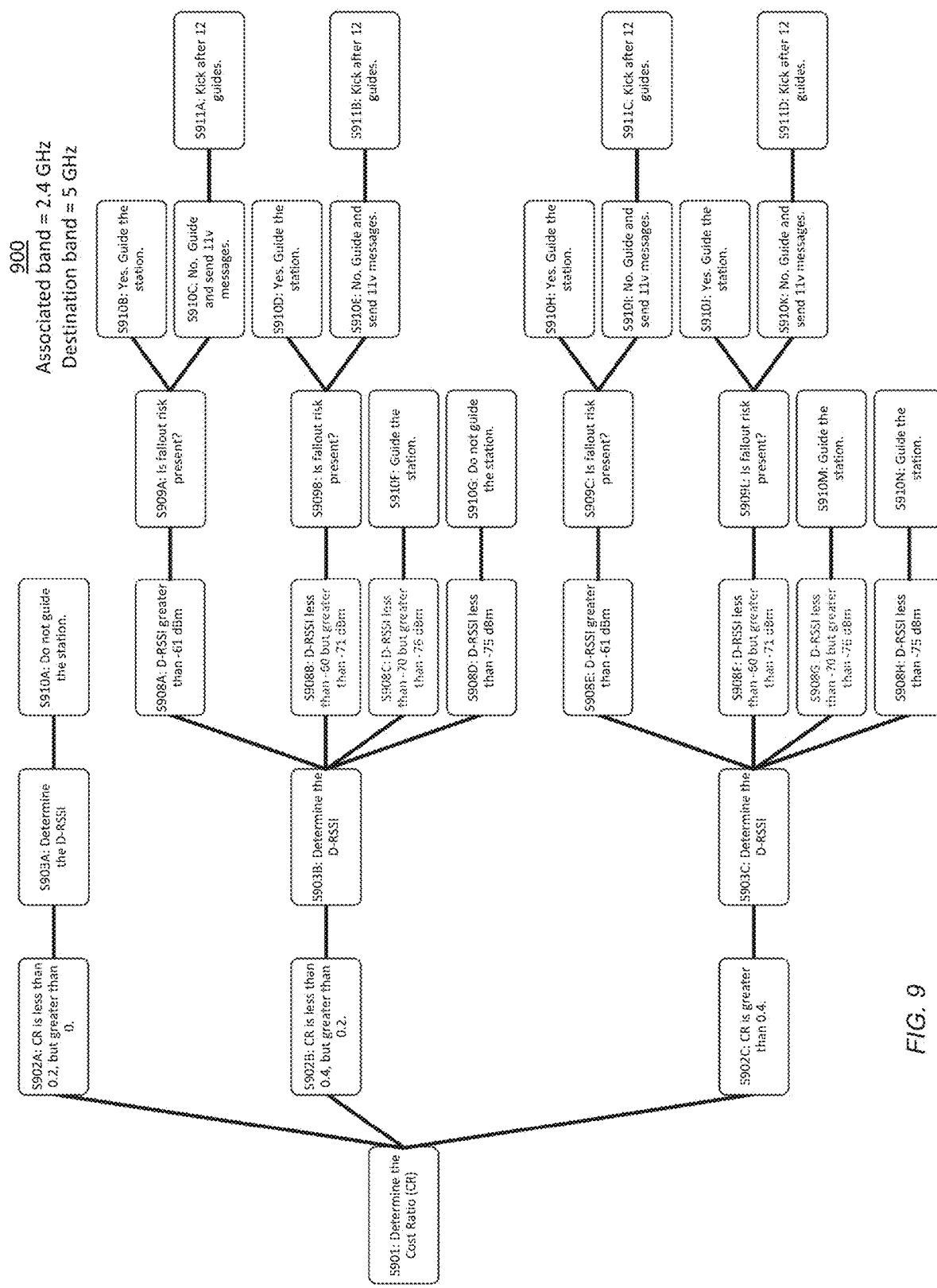
FIG. 9 illustrates an example implementation of a decisional analysis according to one or more embodiments.

FIG. 9 illustrates an example decision process for a STA moving in example scenario 900 from a 2.4 GHz band to a 5 GHz band. Initially, at S901 the CR may be determined.

At S902A, if the CR is less than 0.2, but greater than 0, then at S903A D-RSSI may be determined and at S910A the CSD may not guide the STA.

At S902B the CR may less than 0.4, but greater than 0.2. At S903B the D-RSSI may be determined. At S908A the D-RSSI may be greater than −61 dBm. At S909A, it may be determined if there is fallout risk present. At S910B, if there is fallout risk present, then the CSD may guide the STA. At S910C, if there is no fallout risk present, then the CSD may guide the STA and send 11v messages. At S911A, if there are 12 unsuccessful guide attempts, then the STA may be kicked.

At S908B, D-RSSI may be less than −60 but greater than −71 dBm. At S909B, it may be determined if there is fallout risk present. At S910D, if there is fallout risk present, then the CSD may guide the STA. At S910E, if there is no fallout risk present, then the CSD may guide the STA and send 11v messages. At S911B, if there are 12 unsuccessful guide attempts, then the STA may be kicked.

At S908C, D-RSSI may be less than −70 but greater than −76 dBm, in which case at S910F, the CSD may guide the STA.

At S908D, D-RSSI may be less than −75 dBm, in which case at S910G the CSD may decide not to guide the STA.

At S902C, CR may be greater than 0.4. At S903C, the D-RSSI may be determined. At S908E, D-RSSI may be greater than −61 dBm. At S909C, it may be determined if there is fallout risk present. At S910H, if there is fallout risk present, then the CSD may guide the STA. At S910I, if there is no fallout risk present, then the CSD may guide the STA and send 11v messages. At S911C, if there are 12 unsuccessful guide attempts, then the STA may be kicked.

At S908F, D-RSSI may be less than −60 but greater than −71 dBm. At S909L, it may be determined if there is fallout risk present. At S910J, if there is fallout risk present, then the CSD may guide the STA. At S910K, if there is no fallout risk present, then the CSD may guide the STA and send 11v messages. At S911D, if there are 12 unsuccessful guide attempts, then the STA may be kicked.

At S908G, D-RSSI may be less than −70 but greater than −76 dBm, in which case the CSD may decide at S910M to guide the STA.

At S908H, D-RSSI may be less than −75 dBm, at which point the CSD may decide at S910N to guide the STA.

Figure 10:
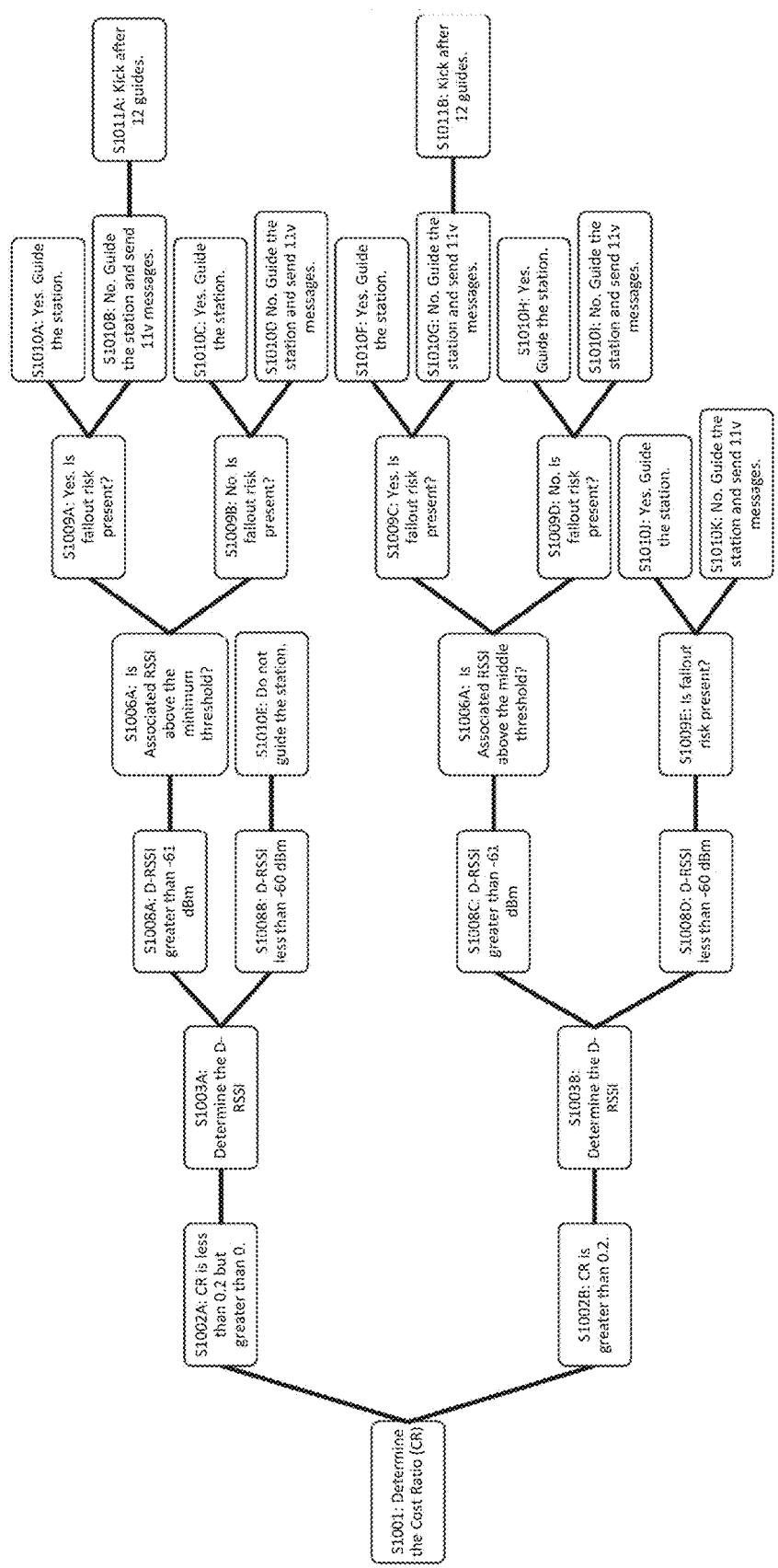
FIG. 10 illustrates an example implementation of a decisional analysis according to one or more embodiments.

FIG. 10 illustrates an example decision process for a STA moving in example scenario 1000 from a 5 GHz band to a 2.4 GHz band. Initially, at S1001, the CR is determined. At S1002A, the CR may be less than 0.2 but greater than 0. At S1003A the D-RSSI may be determined. At S1008A, the D-RSSI may be greater than −61 dBm. At S1006A the CSD may determine whether the associated RSSI is above a minimum threshold (Assoc RSSI<MINTH). This step may check if the STA RSSI observed at the associated interface/AP is below a predetermined but configurable threshold (MINTH, MIDTH, MAXTH). Exemplary values for MINTH, MIDTH, AND MAXTH may be −74, −60, and −55 dBm, respectively.

At S1009A, if the associated RSSI is above the MINTH, then it may be determined if there is fallout risk present. At S1010A, if there is fallout risk present, then the CSD may guide the STA. At S1010B, if there is no fallout risk present, then the CSD may guide the STA and send 11v messages. At S1011A, if there are 12 unsuccessful guide attempts, then the STA may be kicked.

At S1009B, if the associated RSSI is not above the MINTH, it may be determined if there is fallout risk present. At S1010C, if there is fallout risk present, then the CSD may guide the STA. At S1010D, if there is no fallout risk present, then the CSD may guide the STA and send 11v messages.

At S1008B, the D-RSSI may be less than −60 dBm, in which case the CSD may decide at S1010E not to guide the STA.

At S1002B, the CR may be greater than 0.2. At S1003B, the D-RSSI may be determined. At S1008C, the D-RSSI greater than −61 dBm and at S1006A, it may be determined if the associated RSSI is above the MIDTH.

At S1009C, if the associated RSSI is above the MIDTH, then it may be determined if there is fallout risk present. At S1010F, if there is fallout risk present, then the CSD may guide the STA. At S1010G, if there is no fallout risk present, then the CSD may guide the STA and send 11v messages. At S1011B, if there are 12 unsuccessful guide attempts, then the STA may be kicked.

At S1009D: If the associated RSSI is not above the MIDTH, then it may be determined if there is fallout risk present. At S1010H, if there is fallout risk present, then the CSD may guide the STA. At S1010I, if there is no fallout risk present, then the CSD may guide the STA and send 11v messages.

At S1008D, the D-RSSI may be less than −60 dBm, and at S1009E, it may be determined if there is fallout risk present. At S1010J, if there is fallout risk present, then the CSD may guide the STA. At S1010K, if there is no fallout risk present, then the CSD may guide the STA and send 11v messages.

Figure 11A:
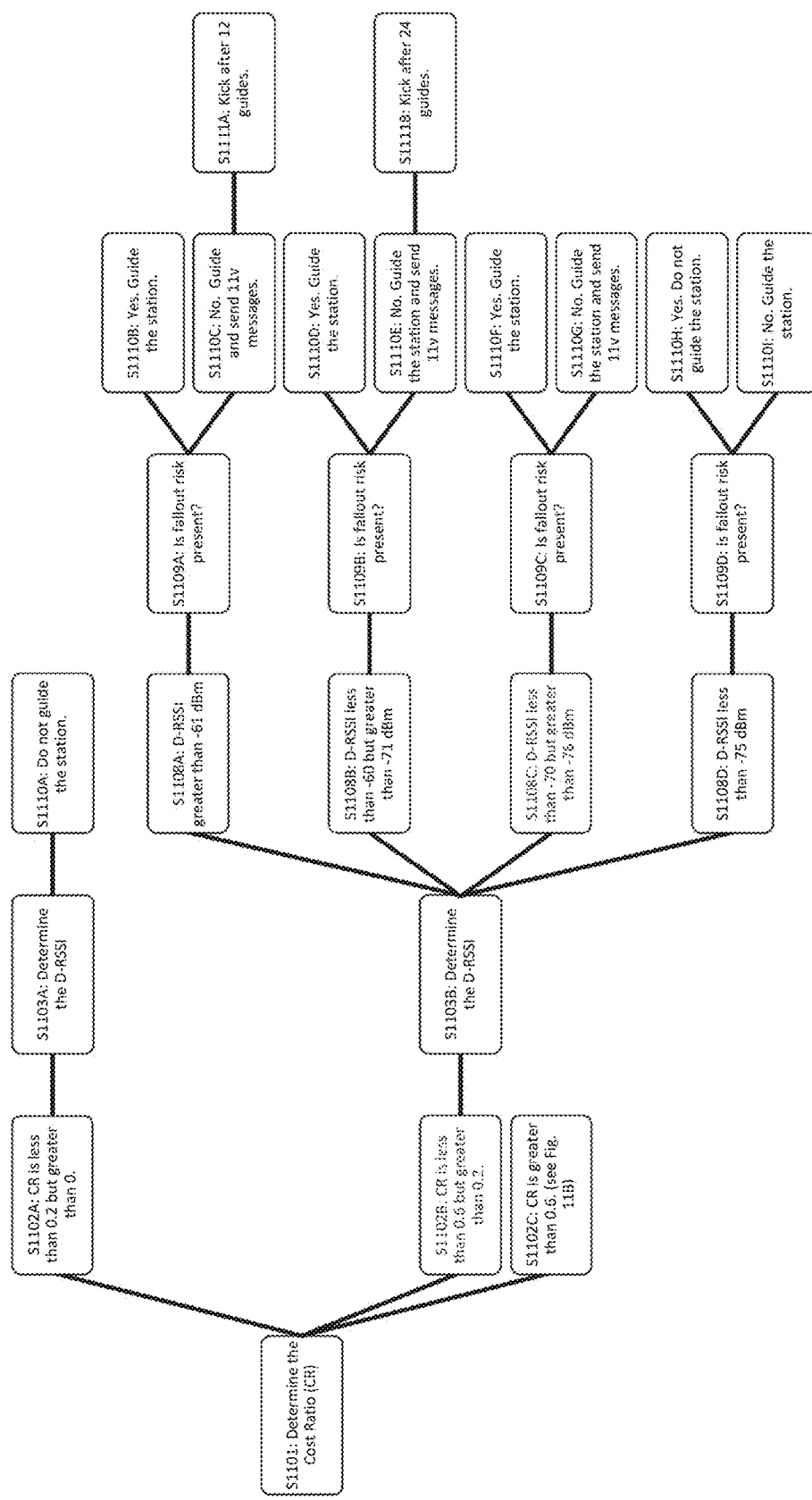
FIG. 11A illustrates a first part of an example implementation of a decisional analysis according to one or more embodiments.

FIG. 11A illustrates a first part of an example decision process for a STA moving in example scenario 1100 from a 5 GHz band to another 5 GHz band. Initially, at S1101 CR may be determined, and at S1102A CR may be less than 0.2 but greater than 0, and at S1103A the D-RSSI may be determined, at which point at S1110A the CSD may decide not to guide the STA.

At S1102B, CR may be less than 0.6 but greater than 0.2, and at S1103B the D-RSSI may be determined. At S1108A D-RSSI may be greater than −61 dBm, and at S1109A, it may be determined if there is fallout risk present. At S1110B, if there is fallout risk present, then the CSD may guide the STA. At S1110C, if there is no fallout risk present, then the CSD may guide the STA and send 11v messages. At S1111A, if there are 12 unsuccessful guide attempts, then the STA may be kicked.

At S1108B, the D-RSSI may be less than −60 but greater than −71 dBm, and at S1109B, it may be determined if there is fallout risk present. At S1110D, if there is fallout risk present, then the CSD may guide the STA. At S1110E, if there is no fallout risk present, then the CSD may guide the STA and send 11v messages. At S1111B, if there are 24 unsuccessful guide attempts, then the STA may be kicked.

At S1108C, the D-RSSI may be less than −70 but greater than −76 dBm, and at S1109C, it may be determined if there is fallout risk present. At S1110F, if there is fallout risk present, then the CSD may guide the STA. At S1110G, if there is no fallout risk present, then the CSD may guide the STA and send 11v messages.

At S1108D, the D-RSSI may be less than −75 dBm, and at S1109D, it may be determined if there is fallout risk present. At S1110H, if there is fallout risk, the CSD may not guide the STA. At S1110I, if there is not fallout risk, then the CSD may guide the STA.

Figure 11B:
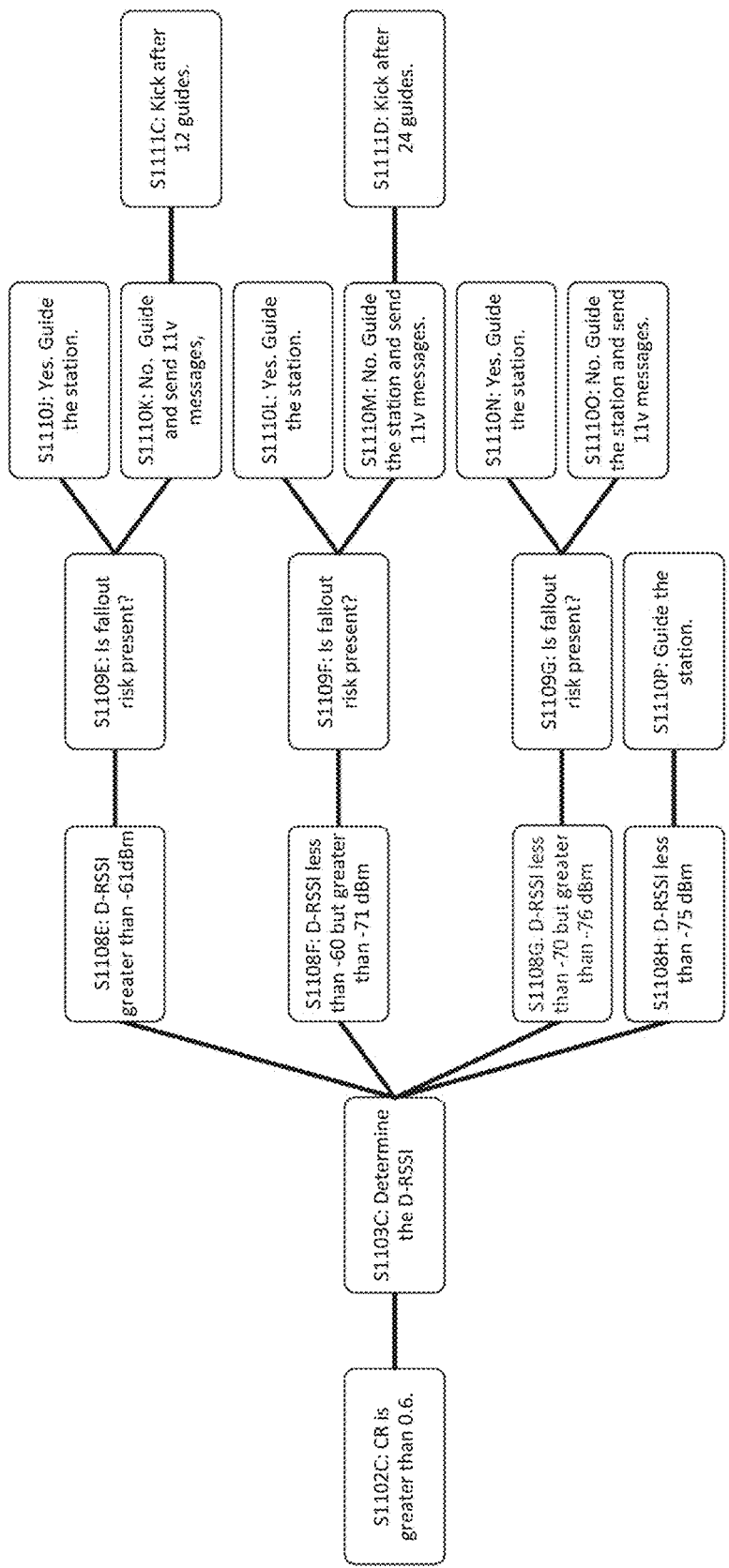
FIG. 11B illustrates a second part of an example implementation of a decisional analysis according to one or more embodiments.

FIG. 11B illustrates a second part of an example decision process for a STA moving in example scenario 1100 from a 5 GHz band to another 5 GHz band. At S1102C, the CR may be greater than 0.6, and at S1103C the D-RSSI may be determined.

At S1108E, the D-RSSI may be greater than −61 dBm, and at S1109E, it may be determined if there is fallout risk present. At S1110J, if there is fallout risk present, then the CSD may guide the STA. At S1110K, if there is no fallout risk present, then the CSD may guide the STA and send 11v messages. At S1111C, if there are 12 unsuccessful guide attempts, then the STA may be kicked.

At S1108F, D-RSSI may be less than −60 but greater than −71 dBm, and at S1109F, it may be determined if there is fallout risk present. At S1110L, if there is fallout risk present, then the CSD may guide the STA. At S1110M, if there is no fallout risk present, then the CSD may guide the STA and send 11v messages. At S1111D, if there are 24 unsuccessful guide attempts, then the STA may be kicked.

At S1108G, the D-RSSI may be less than −70 but greater than −76 dBm, and at S1109G, it may be determined if there is fallout risk present. At S1110N, if there is fallout risk present, then the CSD may guide the STA. At S1110O, if there is no fallout risk present, then the CSD may guide the STA and send 11v messages.

At S1108H, the D-RSSI may be less than −75 dBm, in which case at S1110P the CSD may guide the STA.

Figure 12:
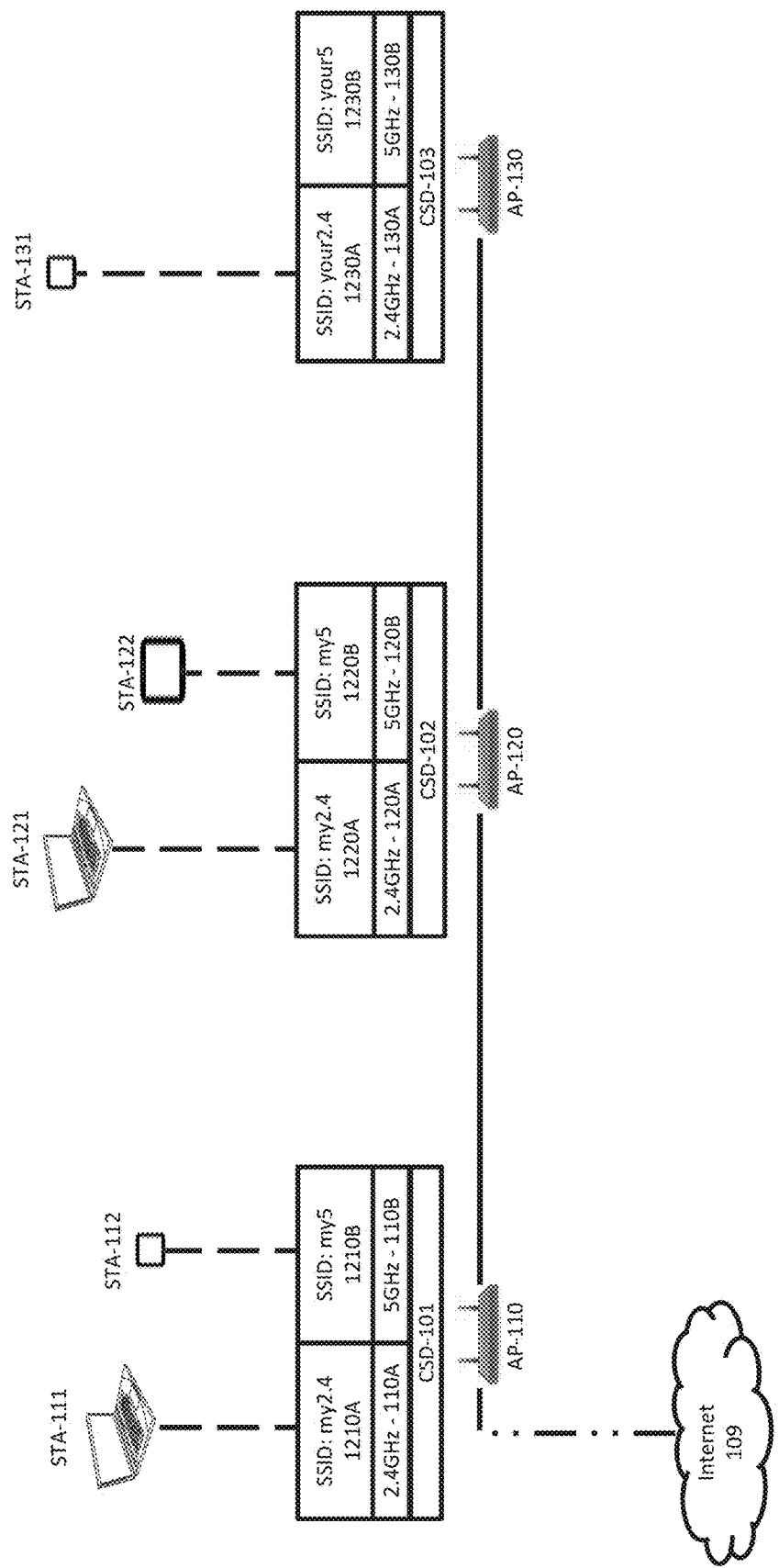
FIG. 12 illustrates an example scenario of multi-SSID support.

FIG. 12 illustrates an example where CSD(s) provide support for multiple separate SSIDs (multi-SSID). In one embodiment there may be multi-SSID support where the CSD may steer clients STAs among SSIDs, passwords of which are already known by the STAs, so that a STA can automatically connect to a known network without requesting the user to enter network password. The CSD may assume that the interfaces that possess the same SSID also use the same network password. For example, interface 120A may have the SSID "my2.4" 1220A which may have the same password as interface 110A's SSID "my2.4" 1210A of the same name. If there are interfaces that have the same SSID but different passwords, the CSD may not be able to differentiate the password difference.

In one case, a STA operating in a particular network of APs may be assumed to support all SSIDs in the network. In another, a STA may be assumed to support only those SSIDs that have been learned and recorded.

Once a STA associates with an interface, the STA may be marked as SSID-capable for that interface's SSID. For example, if STA-111 associates with AP-110's 2.4 GHz interface 110A that has SSID "my2.4," 1210A, then CSD-101 may record that the STA-111 has support for the SSID "my2.4" 1210A.

SSID-capability information may be built up in a cumulative fashion by a CSD. For example, if CSD-101 knows that STA-112 supports the SSID "my5" but hears from the CSD-103 that the same STA-112 supports "your5," possibly from a previous association with AP-130, then CSD-101 adds the new SSID information to the STA-112's capability information.

When a CSD goes into a decision state for a STA, it may consider only the interface SSIDs of which are supported by the STA. That is to say, unsupported SSIDs may not be considered in a cost evaluation. Thus, a STA may only be steered among the interface SSIDs that are known to be supported by the STA. If there is no information about SSID-capability of a STA, then the STA may be assumed to be SSID-capable.

If a STA is detected to fail to associate with an SSID that is different from the steering SSID after a kick (i.e., deauthenticate) action, then the SSID with which the client failed to associate may be marked as "incapable."

For example, STA-111 may be associated with interface 110 which has the SSID "my2.4" 1210A. Further, interface 110B may have the SSID "my5" 1210B. By default, the CSD may assume that STA-111 supports both SSIDs, and may try to steer the STA to the best interface as determined by a decision analysis. Assuming that interface 110B provides lower cost than interface 110A does, and the CSD steers the STA interface 110B by "kicking," then if STA-111 fails to connect to the kicked interface 110B, then STA-111 may be marked as SSID-incapable for the SSID "my5."

A CSD may keep SSID-capability information in memory with the timestamp information for each client. The SSID-capability may be announced in the periodic announcement messages of the CSD with the timestamp that the CSD learns that the STA supports the SSID. For the timestamp, the time retrieved from network time protocol (NTP) may be used. Similarly SSID-incapability may be announced in the periodic announcement messages with a timestamp of the time it is learned. If a CSD has contradictory SSID-capability information about a STA, then the SSID-incapable information may prevail over SSID-capable information. That is to say, if a CSD knows that a STA is SSID-capable, but receives SSID-incapable information from another CSD, then it may update the information to SSID-incapable. SSID-information that is older than a predetermined duration may be erased from memory.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. For example, reference to a CSD may be a specific hardware module or software module part of an AP, and reference to the AP performing an action may be a result of the CSD programming executed by the AP. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a communications interface for use in a GW, STA, AP, terminal, base station, RNC, or any host computer.

What is claimed:

1. A method for optimizing a connection of a first station (STA) in a mesh network of a plurality of 802.11 access points (APs) carried out by a client steering daemon (CSD) running on an AP of the plurality of APs, the method comprising:
   calculating a cost ratio based on a plurality of metrics from a list stored on the AP, wherein the cost ratio is calculated by subtracting a cost of a destination interface from a cost of a current interface to produce a result, and dividing the result by the cost of the current interface;
   comparing signal strength information of the destination interface against a predetermined value;
   analyzing a risk assessment for the STA based on an outcome of the signal strength comparison; and
   sending an announcement message to a plurality of CSDs running on respective APs of each of the plurality of APs with instructions to guide the STA to the destination interface based on the cost ratio and the risk assessment.

2. The method of claim 1, wherein guiding the STA further comprises blacklisting the STA on a current interface, and instructing the plurality of CSDs running on respective APs of each of the plurality of APs to remove the STA from a blacklist associated with the destination interface.

3. The method of claim 2, further comprising sending an 802.11v transition management request message to the STA indicating a medium access control (MAC) address of the destination interface.

4. The method of claim 2, wherein the announcement message further includes instructions to kick the STA to the destination interface, wherein kicking further includes instructing the plurality of CSDs running on respective APs of each of the plurality of APs, except for a CSD associated with the destination interface, to remove an SSID of any beacons sent by the current interface.

5. The method of claim 4, further comprising determining kicking the STA was unsuccessful, placing the STA on an untouchable list stored by the CSD based on a number of failed kicks performed by the CSD, and sending a message to the plurality of APs instructing them to remove the STA from a blacklist of a CSD of each of the plurality of APs.

6. The method of claim 1, wherein the cost of the current interface is calculated by adding a first metric of the plurality of metrics and a second metric of the plurality of metrics, and wherein the first metric is calculated based on a signal strength between the current interface and the STA, and the second metric is provided by a routing daemon.

7. The method of claim 1, wherein the cost of the destination interface is calculated by adding a third metric of the plurality of metrics and a fourth metric of the plurality of metrics, and wherein the third metric is calculated based on a signal strength between the destination interface and the STA, and the fourth metric is provided by a routing daemon.

8. The method of claim 1, further comprising updating the list based on monitoring performed by the CSD and receiving messages from the plurality of CSDs running on respective APs of each of the plurality of APs.

9. The method of claim 1, further comprising acquiring STA capability information by recording past STA connections, observing probe requests, and receiving announcement messages from the plurality of CSDs running on respective APs of each of the plurality of APs.

10. An access point (AP) running a client steering daemon (CSD) for optimizing a connection of a station (STA), the AP connected to a mesh network of a plurality of 802.11 APs, the AP comprising:
a transceiver;
a processor operatively coupled to the transceiver, the processor and transceiver configured to calculate a cost ratio based on a plurality of metrics from a list stored on the AP and compare signal strength information of a destination interface against a predetermined value, wherein the cost ratio is calculated by subtracting a cost of the destination interface from a cost of a current interface to produce a result, and dividing the result by the cost of the current interface; and
based on an outcome of the signal strength comparison, the processor and transceiver are further configured to analyze a risk assessment for the STA and send an announcement message to a plurality of CSDs running on respective APs of each of the plurality of APs with instructions to guide the STA to the destination interface based on the cost ratio and the risk assessment.

11. The AP of claim 10, wherein the processor and transceiver are further configured to blacklist the STA on a current interface, and instruct the plurality of CSDs running on respective APs of each of the plurality of APs to remove the STA from a blacklist associated with the destination interface.

12. The AP of claim 11, wherein the processor and transceiver are further configured to send an 802.11v transition management request message to the STA indicating a medium access control (MAC) address of the destination interface.

13. The AP of claim 11, wherein the announcement message further includes instructions to kick the STA to the destination interface, wherein kicking further includes the processor and transceiver configured to instruct the plurality of CSDs running on respective APs of each of the plurality of APs, except for a CSD associated with the destination interface, to remove an SSID of any beacons sent by the AP running the CSD.

14. The AP of claim 13, wherein the processor and transceiver are further configured to determine that kicking the STA was unsuccessful, place the STA on an untouchable list stored by the CSD based on a number of failed kicks performed by the CSD, and send a message to the plurality of APs instructing them to remove the STA from a blacklist of a CSD of each of the plurality of APs.

15. The AP of claim 10, wherein the cost of the current interface is calculated by adding a first metric of the plurality of metrics and a second metric of the plurality of metrics, and wherein the first metric is calculated based on a signal strength between the current interface and the STA, and the second metric is provided by a routing daemon.

16. The AP of claim 10, wherein the cost of the destination interface is calculated by adding a third metric of the plurality of metrics and a fourth metric of the plurality of metrics, and wherein the third metric is calculated based on a signal strength between the destination interface and the STA, and the fourth metric is provided by a routing daemon.

17. The AP of claim 10, the processor and transceiver are further configured to update the list based on monitoring performed by the CSD and receiving messages from the plurality of CSDs running on respective APs of each of the plurality of APs.

18. The AP of claim 10, the processor and transceiver are further configured to acquire STA capability information by recording past STA connections, observing probe requests, and receiving announcement messages from the plurality of CSDs running on respective APs of each of the plurality of APs.

* * * * *